United States Patent
Kim et al.

(10) Patent No.: US 11,936,585 B2
(45) Date of Patent: *Mar. 19, 2024

(54) METHOD AND DEVICE FOR TRANSMITTING OR RECEIVING DOWNLINK CHANNEL FROM MULTIPLE TRANSMISSION RECEPTION POINTS IN WIRELESS COMMUNICATION SYSTEM

(71) Applicant: LG Electronics Inc., Seoul (KR)

(72) Inventors: Hyungtae Kim, Seoul (KR); Jiwon Kang, Seoul (KR); Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/357,630

(22) Filed: Jul. 24, 2023

(65) Prior Publication Data

US 2023/0388081 A1    Nov. 30, 2023

Related U.S. Application Data

(63) Continuation of application No. 17/791,777, filed as application No. PCT/KR2021/001450 on Feb. 4, 2021, now Pat. No. 11,757,593.

(30) Foreign Application Priority Data

Feb. 10, 2020  (KR) ......................... 10-2020-0015961
Mar. 24, 2020  (KR) ......................... 10-2020-0035942
Jul. 17, 2020  (KR) ......................... 10-2020-0089205

(51) Int. Cl.
  *H04L 5/00*        (2006.01)
(52) U.S. Cl.
  CPC .......... *H04L 5/0051* (2013.01); *H04L 5/0035* (2013.01); *H04L 5/0092* (2013.01)

(58) Field of Classification Search
  CPC ... H04L 5/0051; H04L 5/0035; H04L 5/0092; H04L 5/0091; H04L 1/08; H04W 72/232
  See application file for complete search history.

(56) References Cited

U.S. PATENT DOCUMENTS

| | | |
|---|---|---|
| 11,617,195 B2 | 3/2023 | Huang et al. |
| 2019/0229792 A1* | 7/2019 | John Wilson ......... H04W 72/23 |

(Continued)

OTHER PUBLICATIONS

Notice of Allowance in U.S. Appl. No. 17/791,777, dated Apr. 26, 2023, 9 pages.

*Primary Examiner* — Shukri Taha
(74) *Attorney, Agent, or Firm* — Fish & Richardson P.C.

(57) ABSTRACT

A method and a device of transmitting or receiving a downlink channel from multiple transmission and reception points in a wireless communication system is disclosed. A method of receiving a downlink signal by a terminal in a wireless communication system according to an embodiment of the present disclosure may include repeatedly receiving a downlink control channel including same downlink control information (DCI) in at least one transmission occasion (TO) from at least one transmission reception point (TRP); and based on the DCI including control information related to downlink signal reception, based on a time offset between a specific TO of the at least one TO and a receiving timing of a downlink signal related to the DCI being less than a predetermined threshold, receiving the downlink signal from a single TRP based on a default transmission configuration indicator (TCI) state and the default TCI state may be a TCI state related to a search space set or a control resource set (CORESET) having a lowest identifier in a latest slot that the terminal monitors.

8 Claims, 21 Drawing Sheets

(56) References Cited

U.S. PATENT DOCUMENTS

| | | |
|---|---|---|
| 2019/0342907 A1 | 11/2019 | Huang et al. |
| 2022/0393724 A1 | 12/2022 | Matsumura et al. |
| 2023/0189261 A1* | 6/2023 | Matsumura ....... H04W 72/1273 370/329 |

* cited by examiner

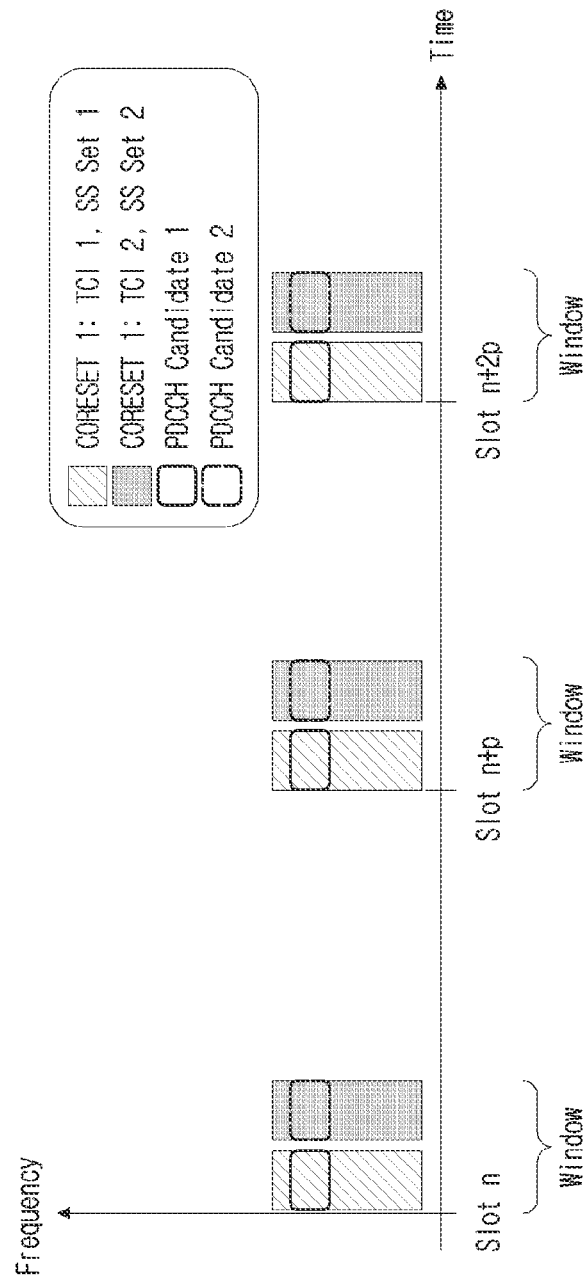

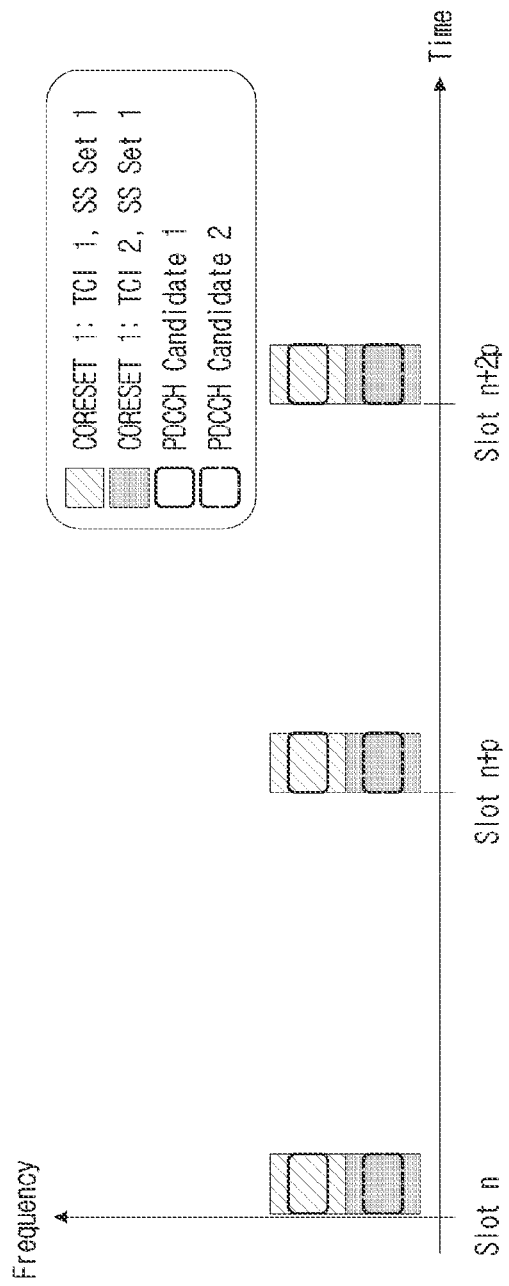

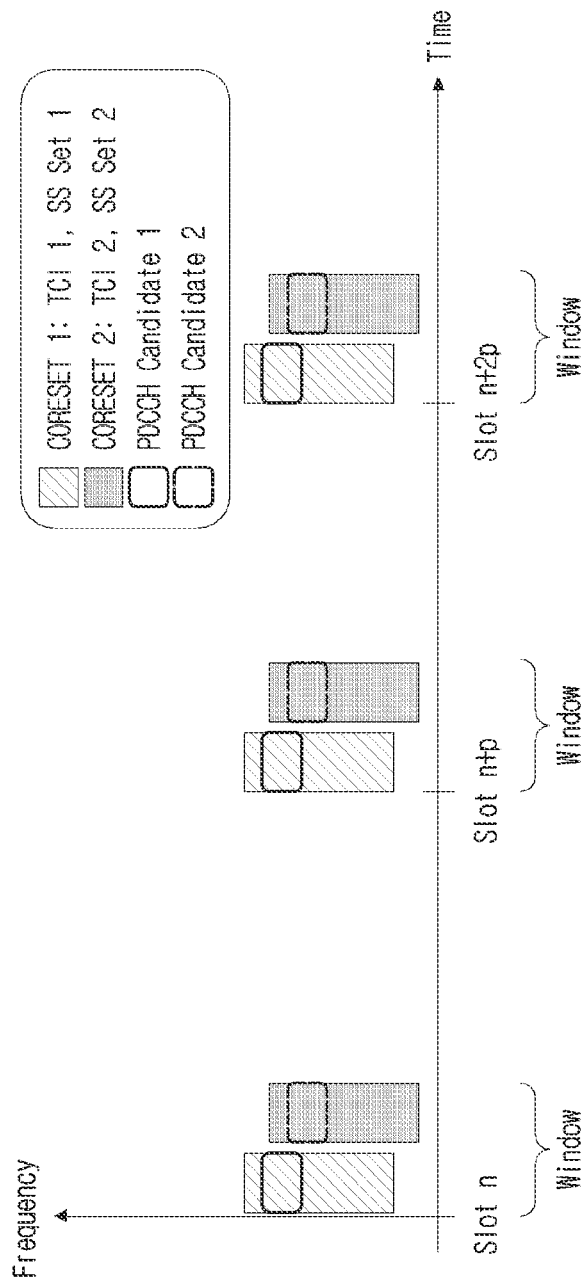

METHOD AND DEVICE FOR TRANSMITTING OR RECEIVING DOWNLINK CHANNEL FROM MULTIPLE TRANSMISSION RECEPTION POINTS IN WIRELESS COMMUNICATION SYSTEM

CROSS-REFERENCE TO RELATED APPLICATIONS

This application is a continuation of U.S. application Ser. No. 17/791,777, filed on Jul. 8, 2022, which is a National Stage application under 35 U.S.C. § 371 of International Application No. PCT/KR2021/001450, filed on Feb. 4, 2021, which claims the benefit of Korean Application No. 10-2020-0089205, filed on Jul. 17, 2020, Korean Application No. 10-2020-0035942, filed on Mar. 24, 2020, and Korean Application No. 10-2020-0015961, filed on Feb. 10, 2020. The disclosures of the prior applications are hereby incorporated by reference herein in their entirety.

TECHNICAL FIELD

The present disclosure relates to a wireless communication system, and in more detail, relates to a method and a device of transmitting or receiving a downlink channel from multiple transmission and reception points in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and a device of transmitting or receiving a downlink channel from multiple TRPs (MTRPs).

An additional technical object of the present disclosure is to provide a method and a device of transmitting or receiving a downlink signal based on a downlink control channel transmitted from MTRPs.

An additional technical object of the present disclosure is to provide a method and a device of transmitting or receiving a downlink signal from a single TRP (STRP) based on a downlink control channel transmitted from MTRPs.

An additional technical object of the present disclosure is to provide a method and a device of transmitting or receiving a downlink signal by applying or determining a transmission configuration indicator (TCI) for a downlink signal transmitted from a STRP based on a downlink control channel transmitted from MTRPs.

The technical objects to be achieved by the present disclosure are not limited to the above-described technical objects, and other technical objects which are not described herein will be clearly understood by those skilled in the pertinent art from the following description.

A method of receiving a downlink signal by a terminal according to an aspect of the present disclosure may include repeatedly receiving a downlink control channel including same downlink control information (DCI) in at least one transmission occasion (TO) from at least one transmission reception point (TRP); and based on the DCI including control information related to downlink signal reception, based on a time offset between a specific TO of the at least one TO and a receiving timing of a downlink signal related to the DCI being less than a predetermined threshold, receiving the downlink signal from a single TRP based on a default transmission configuration indicator (TCI) state and the default TCI state may be a TCI state related to a search space set or a control resource set (CORESET) having a lowest identifier in a latest slot that the terminal monitors.

A method of transmitting a downlink signal by a base station including a first TRP in a wireless communication system according to an additional aspect of the present disclosure may include repeatedly transmitting, by the first TRP or by the first TRP with at least one other TRP to a terminal, a downlink control channel including same downlink control information (DCI) in at least one transmission occasion (TO) from at least one transmission reception point (TRP); and based on the DCI including control information related to downlink signal reception, based on a time offset between a specific TO of the at least one TO and a receiving timing of a downlink signal related to the DCI being less than a predetermined threshold, transmitting, by the first TRP to the terminal, the downlink signal from a single TRP based on a default transmission configuration indicator (TCI) state and the default TCI state may be a TCI state related to a control resource set (CORESET) or a search space set having a lowest identifier in a latest slot that the terminal monitors.

According to an embodiment of the present disclosure, a method and a device of transmitting or receiving a downlink channel from multiple TRPs (MTRPs) may be provided.

According to an embodiment of the present disclosure, a method and a device of transmitting or receiving a downlink signal based on a downlink control channel transmitted from MTRPs may be provided.

According to an embodiment of the present disclosure, a method and a device of transmitting or receiving a downlink signal from a single TRP (STRP) based on a downlink control channel transmitted from MTRPs may be provided.

According to an embodiment of the present disclosure, a method and a device of transmitting or receiving a downlink signal may be provided by applying or determining a transmission configuration indicator (TCI) for a downlink signal transmitted from a STRP based on a downlink control channel transmitted from MTRPs.

According to an embodiment of the present disclosure, based on a downlink control channel transmitted from MTRPs, even when TCI information is not included in a downlink control channel, a TCI associated with a downlink signal transmitted from a STRP may be clearly configured or determined.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 8 is a diagram which illustrates a method of transmitting and receiving downlink control information according to an embodiment of the present disclosure.

FIG. 10 is a diagram which illustrates a method of transmitting and receiving downlink control information according to an embodiment of the present disclosure.

FIG. 11 is a diagram which illustrates a method of transmitting and receiving downlink control information according to an embodiment of the present disclosure.

DETAILED DESCRIPTION

Figure 1:
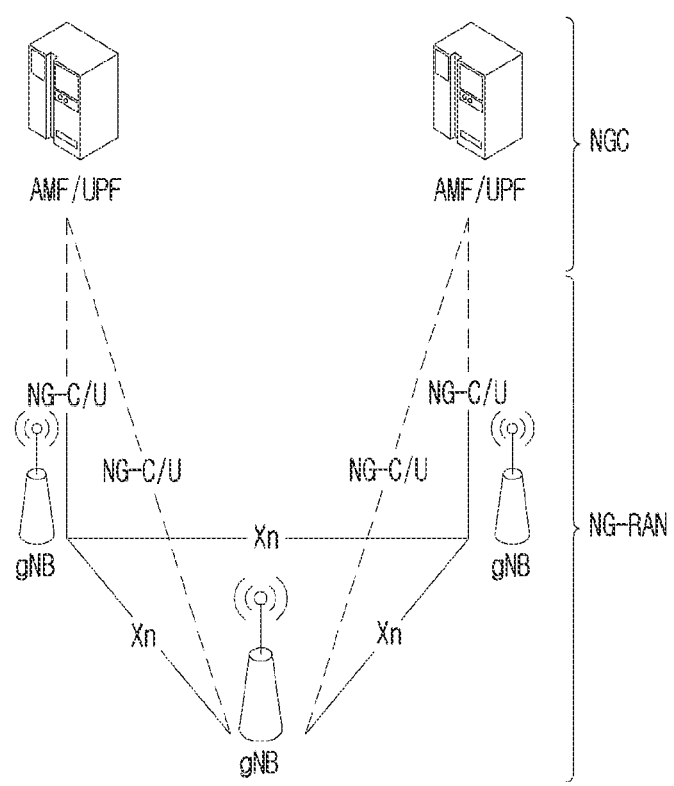
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11(Wi-Fi), IEEE 802.16(WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
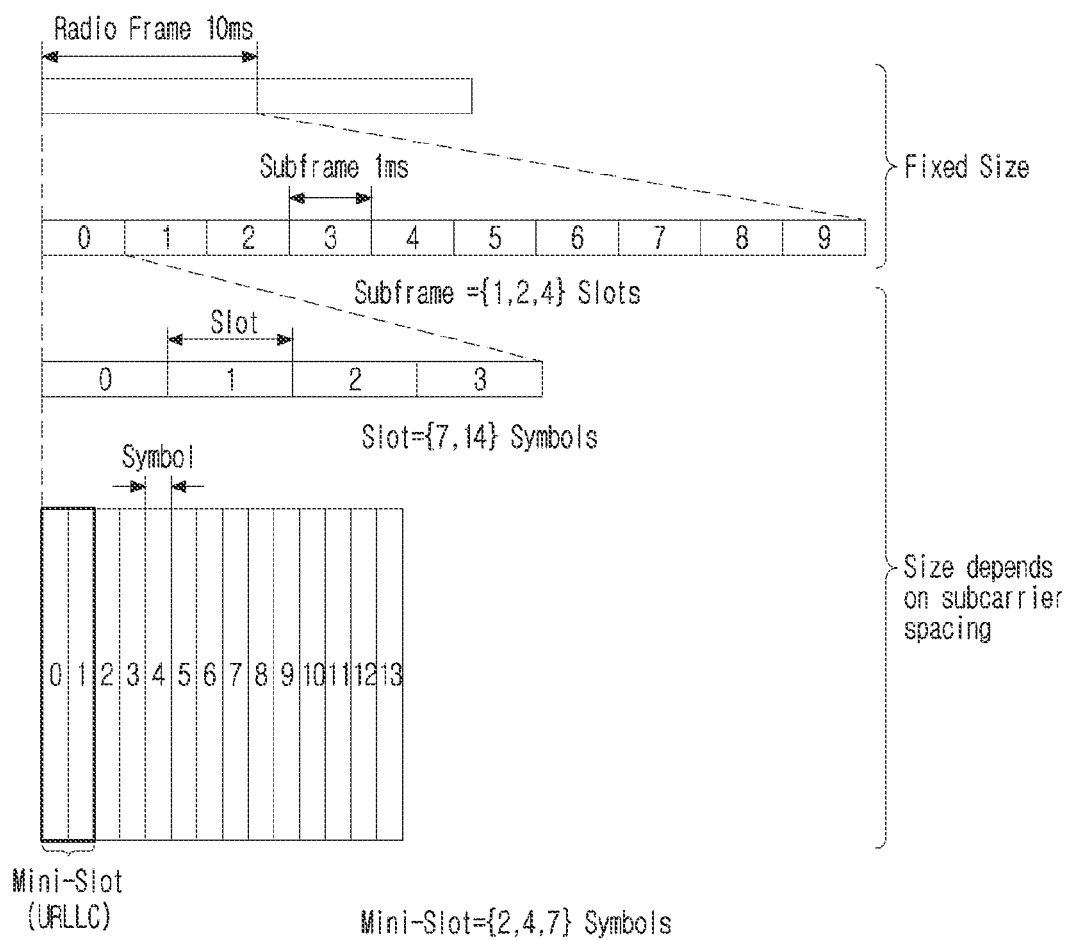
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, µ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| µ | Δf = $2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration µ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| µ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on µ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
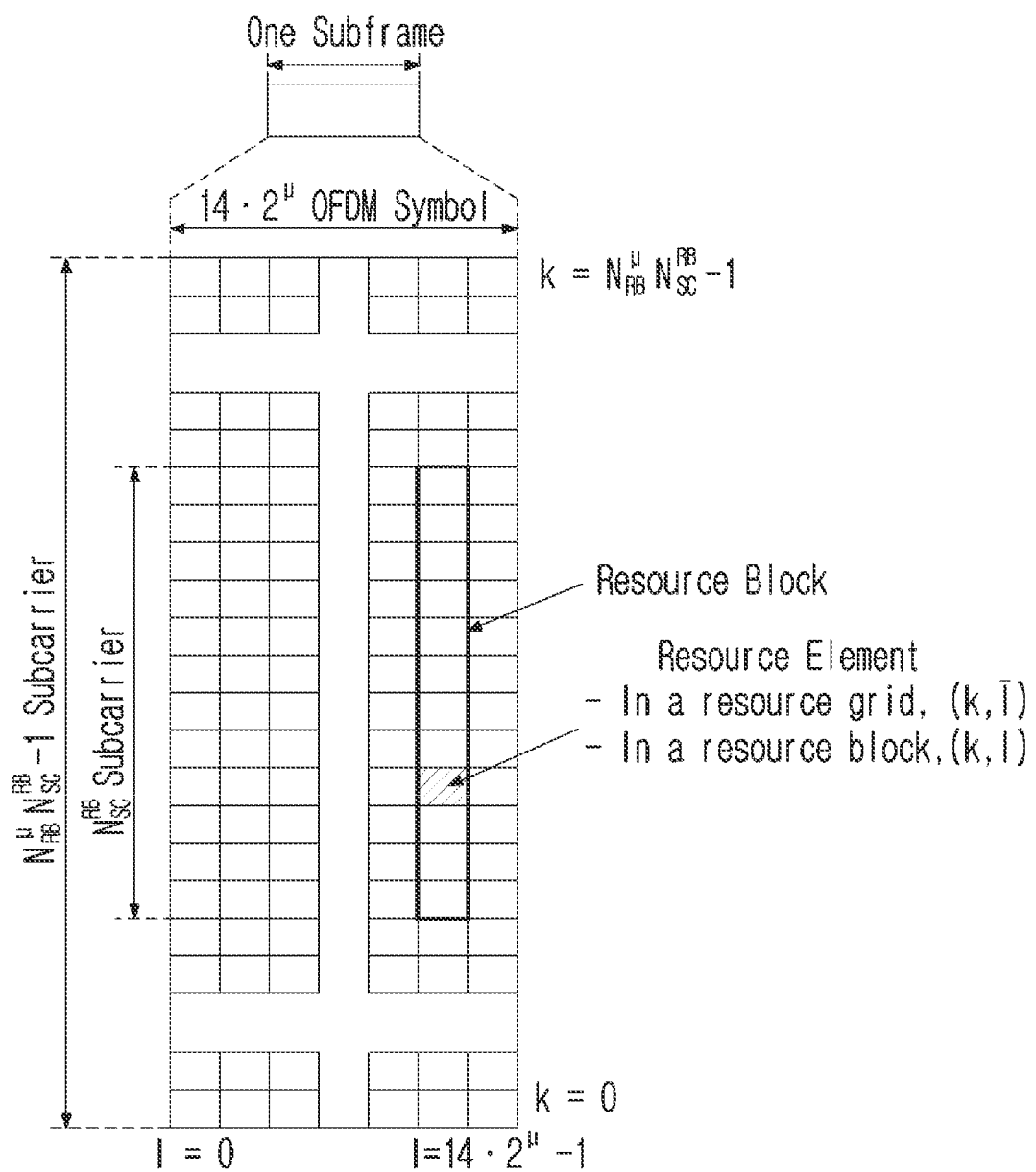
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^{\mu} N_{sc}^{RB}-1$ is an index in a frequency domain and l'=0, . . . , $2^{\mu} N_{symb}^{(\mu)}-1$ refers to a position of a symbol in a subframe. When referring to a resource element in a slot, an index pair (k,l) is used. Here, l=0, . . . , $N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{Equation 1}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{Equation 2}$$

$N_{BWP,i}^{start,\mu}$ is a common resource block that a BWP starts relatively to common resource block 0.

Figure 4:
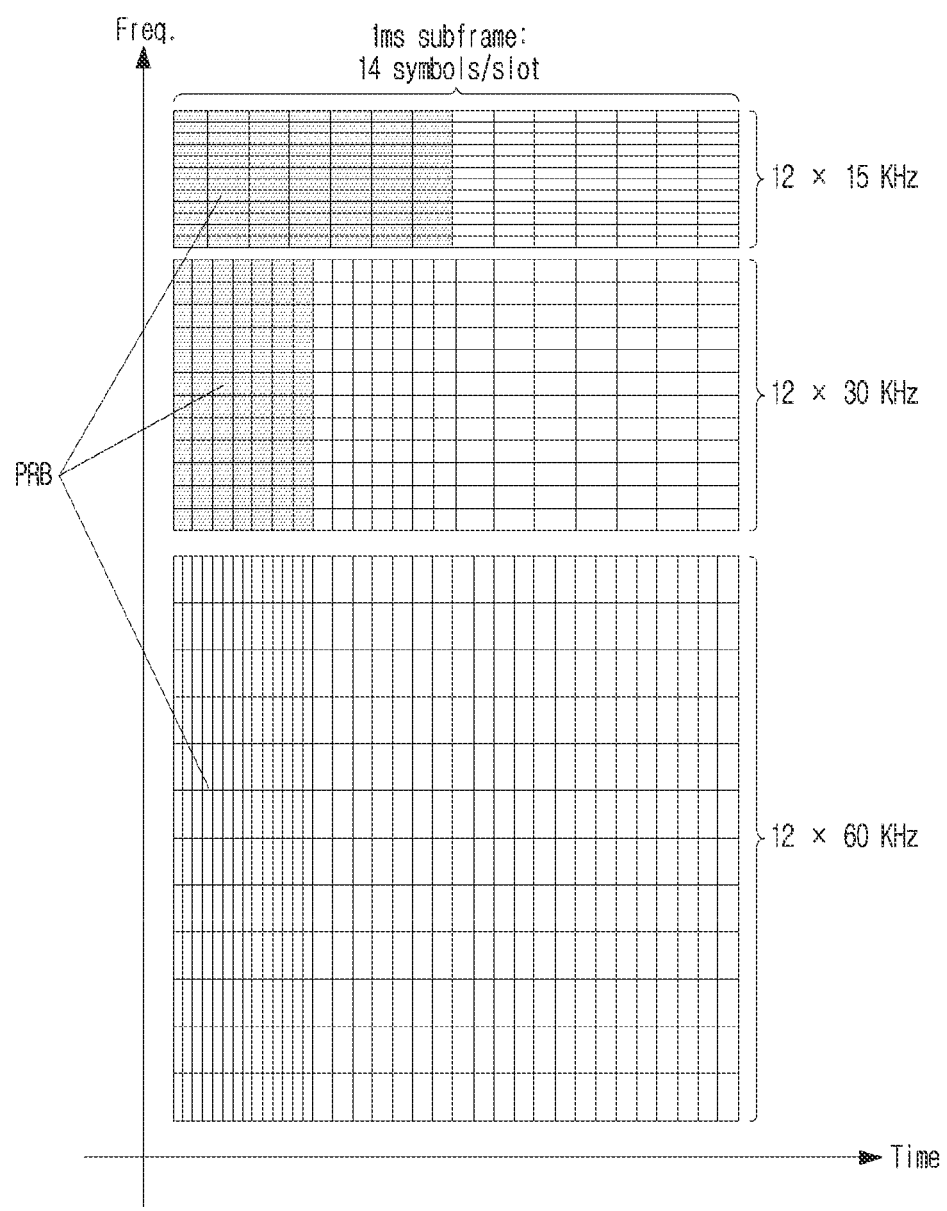
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
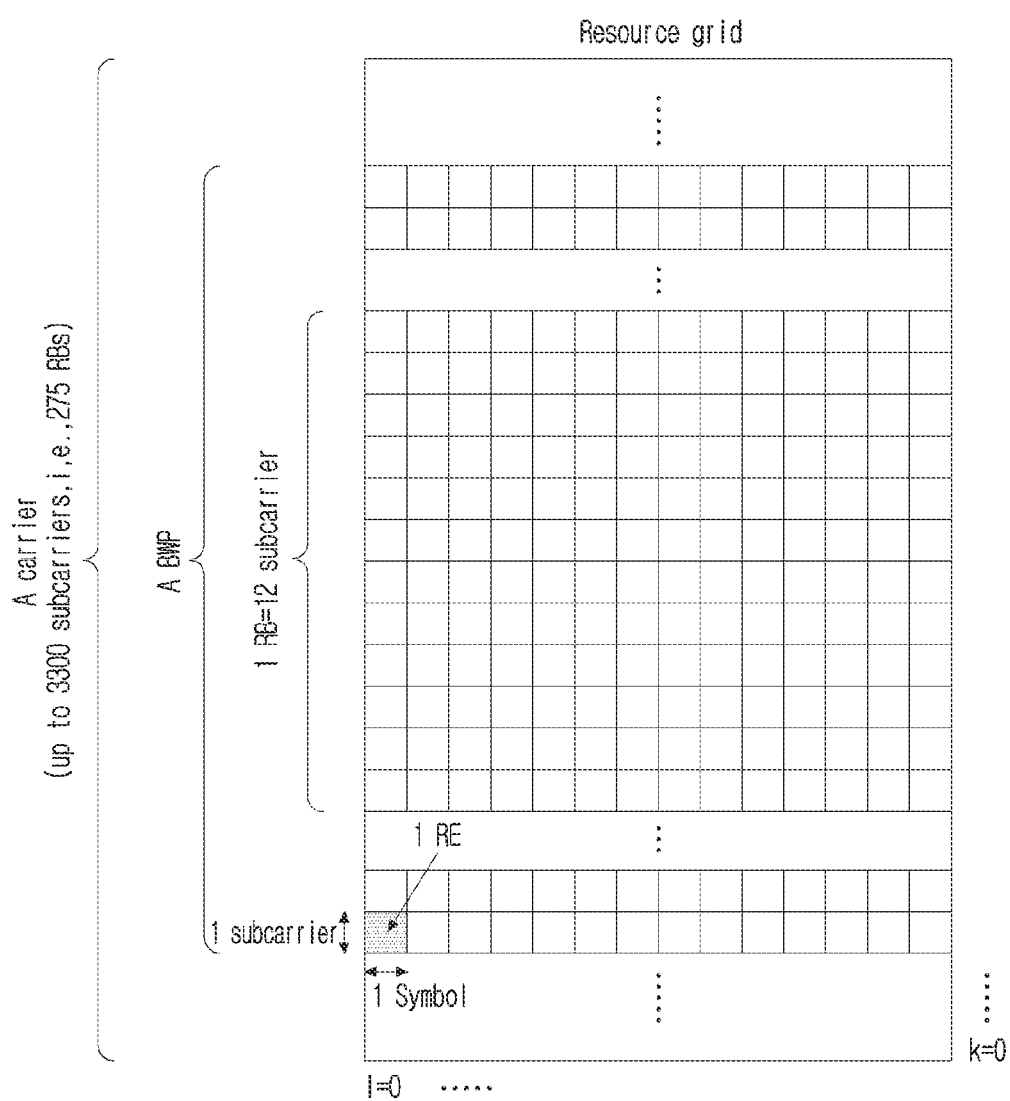
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
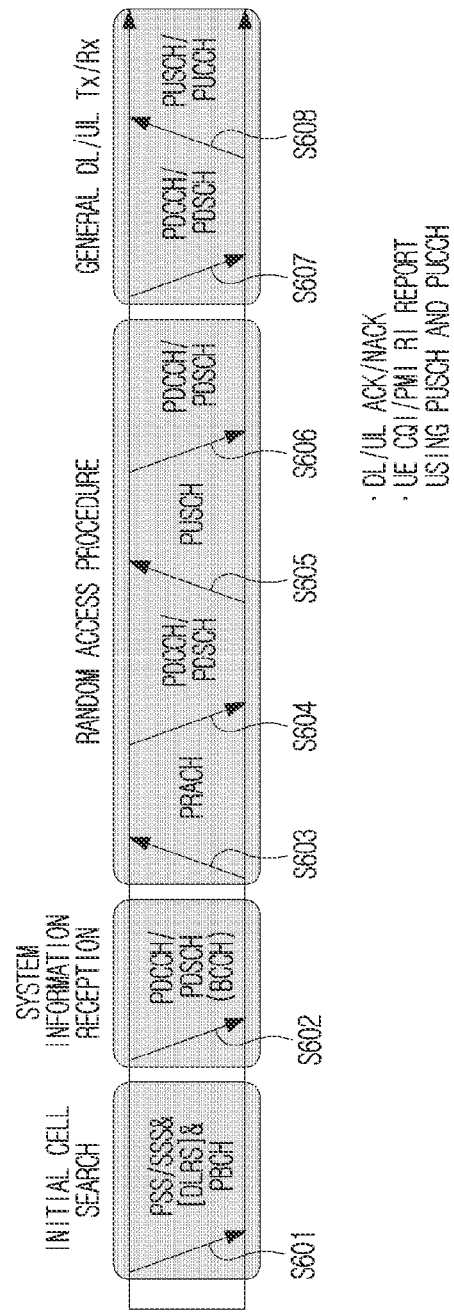
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs)(or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme' is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figures 7A, 7B:
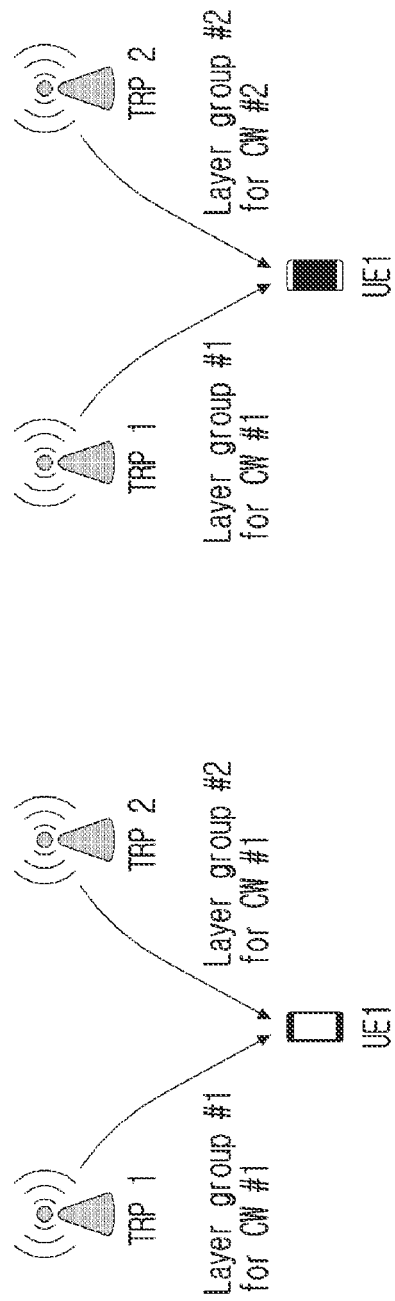
FIGS. 7A and 7B illustrate a method of transmitting multiple TRPs in a wireless communication system to which the present disclosure may be applied.

FIGS. 7A and 7B illustrate a method of multiple TRPs transmission in a wireless communication system to which the present disclosure may be applied.

In reference to FIG. 7A, it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7B, an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7B, it may have a disadvantage that a code rate corresponding to a TB is higher compared to FIG. 7A. However, it has an advantage that it may adjust a code rate by indicating a different RV (redundancy version) value or may adjust a modulation order of each CW for encoded bits generated from the same TB according to a channel environment.

According to methods illustrated in FIGS. 7A and 7B above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following method is discussed.

1) Method 1 (SDM): Time and frequency resource allocation is overlapped and n (n<=Ns) TCI states in a single slot 1-a) Method 1a The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule.

1-b) Method 1b

The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

At one transmission time (occasion), the same TB having one DMRS port associated with multiple TCI state indexes is transmitted in one layer or the same TB having multiple DMRS ports one-to-one associated with multiple TCI state indexes is transmitted in one layer.

In case of the method 1a and 1c, the same MCS is applied to all layers or all layer sets.

2) Method 2 (FDM): Frequency Resource Allocation is not Overlapped and n (n<=Nf) TCI States in a Single Slot Each non-overlapping frequency resource allocation is associated with one TCI state.

The same single/multiple DMRS port(s) are associated with all non-overlapping frequency resource allocation.

2-a) Method 2a
A single codeword having one RV is used for all resource allocation. With regard to UE, common RB matching (mapping of a codeword to a layer) is applied to all resource allocation.
2-b) Method 2b
A single codeword having one RV is used for each non-overlapping frequency resource allocation. A RV corresponding to each non-overlapping frequency resource allocation may be the same or different.

For the method 2a, the same MCS is applied to all non-overlapping frequency resource allocation.

3) Method 3 (TDM): Time resource allocation is not overlapped and n (n<=Nt1) TCI states in a single slot
Each transmission time (occasion) of a TB has time granularity of a mini-slot and has one TCI and one RV.
A common MCS is used with a single or multiple DMRS port(s) at every transmission time (occasion) in a slot.
A RV/TCI may be the same or different at a different transmission time (occasion).

4) Method 4 (TDM): n (n<=Nt2) TCI states in K (n<=K) different slots
Each transmission time (occasion) of a TB has one TCI and one RV.
Every transmission time (occasion) across K slots uses a common MCS with a single or multiple DMRS port(s).
A RV/TCI may be the same or different at a different transmission time (occasion).

Hereinafter, MTRP URLLC is described.

In the present disclosure, DL MTRP URLLC means that multiple TRPs transmit the same data (e.g., the same TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is configured from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.

And, in the present disclosure, UL MTRP-URLLC means that multiple TRPs receive the same data/UCI (uplink control information) from any UE by using a different layer/time/frequency resource. For example, TRP 1 receives the same data/DCI from UE in resource 1 and TRP 2 receives the same data/DCI from UE in resource 2 to share received data/DCI through a backhaul link connected between TRPs. UE configured with a UL MTRP-URLLC transmission method transmits the same data/UCI by using a different layer/time/frequency resource. In this case, UE is configured from a base station for which Tx beam and which Tx power (i.e., a UL TCI state) should be used in a layer/time/frequency resource transmitting the same data/DCI. For example, when the same data/UCI is transmitted in resource 1 and resource 2, a UL TCI state used in resource 1 and a UL TCI state used in resource 2 may be configured. Such UL MTRP URLLC may be applied to a PUSCH/a PUCCH.

In addition, in the present disclosure, when a specific TCI state (or TCI) is used (or mapped) in receiving data/DCI/UCI for any frequency/time/space resource (layer), it means as follows. For a DL, it may mean that a channel is estimated from a DMRS by using a QCL type and a QCL RS indicated by a corresponding TCI state in that frequency/time/space resource (layer) and data/DCI is received/demodulated based on an estimated channel. In addition, for a UL, it may mean that a DMRS and data/UCI are transmitted/modulated by using a Tx beam and power indicated by a corresponding TCI state in that frequency/time/space resource.

Here, an UL TCI state has Tx beam and/or Tx power information of UE and may configure spatial relation information, etc. to UE through other parameter, instead of a TCI state. An UL TCI state may be directly indicated by UL grant DCI or may mean spatial relation information of a SRS resource indicated by a SRI (sounding resource indicator) field of UL grant DCI. Alternatively, it may mean an open loop (OL) Tx power control parameter connected to a value indicated by a SRI field of UL grant DCI (e.g., j: an index for open loop parameter Po and alpha (up to 32 parameter value sets per cell), q_d: an index of a DL RS resource for PL (pathloss) measurement (up to 4 measurements per cell), l: a closed loop power control process index (up to 2 processes per cell)).

Hereinafter, MTRP eMBB is described.

In the present disclosure, MTRP-eMBB means that multiple TRPs transmit different data (e.g., a different TB) by using a different layer/time/frequency. UE configured with a MTRP-eMBB transmission method receives an indication on multiple TCI states through DCI and assumes that data received by using a QCL RS of each TCI state is different data.

On the other hand, UE may figure out whether of MTRP URLLC transmission/reception or MTRP eMBB transmission/reception by separately dividing a RNTI for MTRP-URLLC and a RNTI for MTRP-eMBB and using them. In other words, when CRC masking of DCI is performed by using a RNTI for URLLC, UE considers it as URLLC transmission and when CRC masking of DCI is performed by using a RNTI for eMBB, UE considers it as eMBB transmission. Alternatively, a base station may configure MTRP URLLC transmission/reception or TRP eMBB transmission/reception to UE through other new signaling.

In a description of the present disclosure, it is described by assuming cooperative transmission/reception between 2 TRPs for convenience of a description, but a method proposed in the present disclosure may be also extended and applied in 3 or more multiple TRP environments and in addition, it may be also extended and applied in multiple panel environments (i.e., by matching a TRP to a panel). In addition, a different TRP may be recognized as a different TCI state to UE. Accordingly, when UE receives/transmits data/DCI/UCI by using TCI state 1, it means that data/DCI/UCI is received/transmitted from/to a TRP 1.

Hereinafter, methods proposed in the present disclosure may be utilized in a situation that MTRPs cooperatively transmit a PDCCH (repetitively transmit or partitively transmit the same PDCCH). In addition, methods proposed in the present disclosure may be also utilized in a situation that MTRPs cooperatively transmit a PDSCH or cooperatively receive a PUSCH/a PUCCH.

In addition, in the present disclosure, when a plurality of base stations (i.e., MTRPs) repetitively transmit the same PDCCH, it may mean the same DCI is transmitted through multiple PDCCH candidates and it may also mean that a plurality of base stations repetitively transmit the same DCI. Here, the same DCI may mean two DCI with the same DCI format/size/payload. Alternatively, although two DCI has a different payload, it may be considered the same DCI when a scheduling result is the same. For example, a TDRA (time domain resource allocation) field of DCI relatively determines a slot/symbol position of data and a slot/symbol position of A/N (ACK/NACK) based on a reception occasion of DCI, so if DCI received at n occasions and DCI received at n+1 occasions inform UE of the same scheduling result, a TDRA field of two DCI is different and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of the other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure, when a plurality of base stations (i.e., MTRPs) partitively transmit the same PDCCH, it means that one DCI is transmitted through one PDCCH candidate, but TRP 1 transmits some resources that such a PDCCH candidate is defined and TRP 2 transmits the remaining resources. One PDCCH candidate partitively transmitted by a plurality of base stations (i.e., MTRPs) may be indicated to a terminal (UE) through a configuration described below or may be recognized or determined by a terminal.

In addition, in the present disclosure, when UE repetitively transmits the same PUSCH so that a plurality of base stations (i.e., MTRPs) can receive it, it may mean that UE transmitted the same data through multiple PUSCHs. In this case, each PUSCH may be optimized and transmitted to an UL channel of a different TRP. For example, when UE repetitively transmits the same data through PUSCH 1 and 2, PUSCH 1 is transmitted by using UL TCI state 1 for TRP 1 and in this case, link adaptation such as a precoder/MCS, etc. may be also scheduled/applied to a value optimized for a channel of TRP 1. PUSCH 2 is transmitted by using UL TCI state 2 for TRP 2 and link adaptation such as a precoder/MCS, etc. may be also scheduled/applied to a value optimized for a channel of TRP 2. In this case, PUSCH 1 and 2 which are repetitively transmitted may be transmitted at a different time to be TDM, FDM or SDM.

In addition, in the present disclosure, when UE partitively transmits the same PUSCH so that a plurality of base stations (i.e., MTRPs) can receive it, it may mean that UE transmits one data through one PUSCH, but it divides resources allocated to that PUSCH, optimizes them for an UL channel of a different TRP and transmits them. For example, when UE transmits the same data through 10 symbol PUSCHs, data is transmitted by using UL TCI state 1 for TRP 1 in 5 previous symbols and in this case, link adaptation such as a precoder/MCS, etc. may be also scheduled/applied to a value optimized for a channel of TRP 1. The remaining data is transmitted by using UL TCI state 2 for TRP 2 in the remaining 5 symbols and in this case, link adaptation such as a precoder/MCS, etc. may be also scheduled/applied to a value optimized for a channel of TRP 2. In the example, transmission for TRP 1 and transmission for TRP 2 are TDM-ed by dividing one PUSCH into time resources, but it may be transmitted by a FDM/SDM method.

In addition, similarly to the above-described PUSCH transmission, also for a PUCCH, UE may repetitively transmit the same PUCCH or may partitively transmit the same PUCCH so that a plurality of base stations (i.e., MTRPs) receive it.

Hereinafter, a proposal of the present disclosure may be extended and applied to a variety of channels such as a PUSCH/a PUCCH/a PDSCH/a PDCCH, etc.

MTRP (Multi-TRP)-URLLC is a method that multiple TRP (MTRP: Multiple TRP) transmit the same data by using a different layer/time/frequency resource. Here, data transmitted from each TRP is transmitted by using a different TCI state per each TRP.

If it is extended into a method that MTRPs transmit the same DCI by using a different PDCCH candidate, a PDCCH candidate that the same DCI is transmitted from each TRP may be transmitted by using a different TCI state. Here, in this case, a specific definition on a CORESET on each PDCCH candidate, a search space (SS) set configuration method, etc. is needed.

Embodiment 1

Embodiment 1 describes a method that a plurality of base stations (i.e., MTRPs) repetitively transmit a PDCCH.

Embodiment 1 describes a method that a plurality of base stations (i.e., MTRPs) repetitively transmit a PDCCH.

When a plurality of base stations (i.e., MTRPs) repetitively transmit a PDCCH, R, the number of repeat transmission, may be directly indicated by a base station to UE or may be mutually promised. Here, R, the number of repeat transmission, is mutually promised, R, the number of repeat transmission, may be determined based on the number of TCI (Transmission Configuration Indication) states configured to repetitively transmit the same PDCCH. For example, if a base station configures r TCI states to repetitively transmit the same PDCCH to UE, R=r may be promised. Here, for example, R=M*r may be configured and a base station may indicate M to UE.

When a plurality of base stations (i.e., MTRPs) repetitively transmit the same PDCCH, TRP 1 may transmit DCI through PDCCH candidate 1 and TRP 2 may transmit DCI through PDCCH candidate 2. The mapping order of a TRP and a PDCCH candidate is just for convenience of a description and does not limit a technical scope of the present disclosure. Each PDCCH candidate is transmitted by a different TRP, so each PDCCH candidate is received by using a different TCI state. Here, for PDCCH candidates transmitting the same DCI, part or all of a scrambling/aggregation level, a CORESET, a search space (SS) set of a PDCCH may be different.

2 (or 2 or more) PDCCH candidates repetitively transmitted by a plurality of base stations (i.e., MTRPs) may be recognized/indicated to UE through the following configuration.

Hereinafter, for convenience of a description, when the same DCI is transmitted/received through two PDCCH candidates, it is described as an example, but a proposal of the present disclosure may be extended and applied even when the same DCI is transmitted/received through 3 or more PDCCH candidates. In this case, reliability may be improved. For example, TRP 1 may transmit the same DCI through PDCCH candidate 1 and 2 and TRP 2 may transmit the same DCI through PDCCH candidate 3 and 4.

In addition, for SS set(s) that a plurality of base stations (i.e., MTRPs) repetitively transmit the same PDCCH, the same PDCCH may be repetitively transmitted only for some DCI formats/SS s/RNTI types defined in a SS set and may not be repetitively transmitted for the rest, which may be indicated by a base station to UE. For example, a base station may indicate to UE that repeat transmission is performed only for format 1-0 (or 1-1) for a SS set that both DCI format 1-0 and 1-1 are defined. Alternatively, a base station may indicate to UE that repeat transmission is performed only for a common SS (or an UE specific SS) among an UE specific SS and a common SS. Alternatively, a base station may indicate to UE that the same PDCCH is repetitively transmitted only for DCI CRC masked with a specific RNTI (e.g., RNTIs, MCS-C-RNTIs, CS-RNTIs excluding C-RNTIs).

Embodiment 1-1) Two PDCCH Candidates Transmitting the Same DCI Share One (the Same) CORESET, but May be Defined/Configured in a Different SS Set FIG. 8 is a diagram which illustrates a method of transmitting and receiving downlink control information according to an embodiment of the present disclosure.

In reference to FIG. 8, PDCCH candidate 1 may be transmitted by using TCI state 1 and PDCCH candidate 2 may be transmitted by using TCI state 2. In addition, the same DCI may be transmitted through PDCCH candidate 1 and PDCCH candidate 2, respectively. In addition, both PDCCH candidate 1 and PDCCH candidate 2 may be (repetitively) transmitted at a specific period interval in a time domain.

Each PDCCH candidate shares the same CORESET, but may be defined/configured in a different SS set. And, TCI state 1 of two TCI states configured for the same CORESET may be used in SS Set 1 that PDCCH candidate 1 exists and TCI state 2 may be used in SS Set 2 that PDCCH candidate 2 exists.

In a current standard, a CORESET ID is configured in a SS set and a corresponding SS set and a CORESET are connected. According to an embodiment of the present disclosure, one CORESET may be connected (mapped) to a plurality of TCI states (e.g., two TCI states). In this case, information on whether which TCI of two TCIs of a corresponding CORESET should be used to decode a PDCCH may be defined/configured together as well as a CORESET ID in a configuration for a SS set.

In addition, a base station may inform UE of at which occasion (TO: Transmission occasion) a PDCCH candidate of SS set 1 corresponding to the same DCI and a PDCCH candidate of SS set 2 are transmitted/received. It may be defined/referred to as a window that the same DCI is transmitted. For example, it may be indicated by a base station to UE that SS set 1 and SS set 2 defined in one slot identical to UE (i.e., window=1 slot) are a SS set that the same DCI is transmitted or may be mutually promised between a base station and UE.

More generally, a window that the same DCI is transmitted (e.g., 1 slot) may be indicated by a base station to UE or may be mutually promised between a base station and UE.

For example, such a window (e.g., n time) may be mutually promised between a base station and UE or may be configured by a base station to UE to start at every TO (occasion when a PDCCH candidate is transmitted) of a standard set (e.g., a lowest ID (Identifier) SS set) among SS sets defined to transmit the same DCI. Here, when a TO of a lowest ID SS set appears several times in one window, windows may be overlapped, so in order to prevent it, the following (n+1) window may be defined/configured based on a TO of a lowest ID SS set not included in a specific (n) window. In addition, desirably, N windows may be defined per period of a standard set (e.g., a lowest ID SS set). Here, N may be indicated by a base station to UE. For example, when a period is 10 slots, a SS set is defined in a fist, second and third slot of 10 slots, a window is 1 slot and N is 2, each window may be defined in a first and second slot during a period of every lowest ID SS set.

Hereinafter, a PDCCH TO and TCI mapping method in one window is described.

Figure 9A:
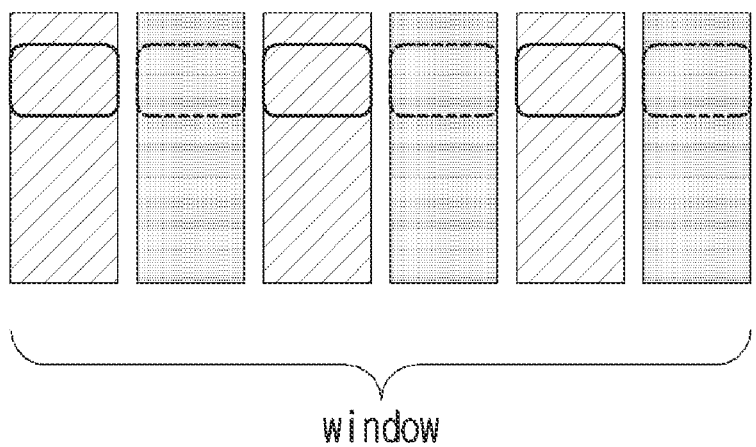
FIGS. 9A and 9B are diagrams which illustrates a mapping method between a PDCCH transmission occasion and a TCI state according to an embodiment of the present disclosure.
Figure 9B:
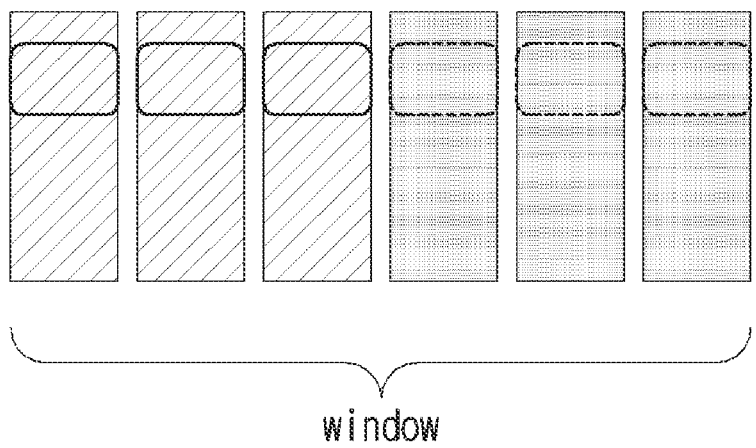

FIGS. 9A and 9B are diagrams which illustrates a mapping method between a PDCCH transmission occasion and a TCI state according to an embodiment of the present disclosure.

There are multiple PDCCH TOs in one window and a different TCI state may be mapped per each TO. Here, the following two methods may be considered by a mapping method of a TO and a TCI.

First, as a TO increases in a window (in ascending order), a TCI state may be sequentially mapped in a circular way. For example, when N TOs and M TCI states are indicated in a window, a i-th TO may be mapped to a i-th TCI and for N>M, a first TCI and a second TCI may be sequentially mapped to a M+1-th TO and a M+2-th TO, respectively. For example, as in FIG. 9A, a case is assumed in which 6 PDCCH TOs are configured and 2 TCI states are configured in one window. In this case, in one window, a first PDCCH TO may be mapped to a first TCI state, a second PDCCH TO may be mapped to a second TCI state, a third PDCCH TO may be mapped to a first TCI state, a fourth PDCCH TO may be mapped to a second TCI state, a fifth PDCCH TO may be mapped to a first TCI state and a sixth PDCCH TO may be mapped to a second TCI state.

Alternatively, second, a group and a TCI state may be sequentially mapped in a circular way by grouping floor(N/M) (floor(x) is the largest integer not larger than x) or ceil(N/M) (ceil(x) is the smallest integer not smaller than x) TOs adjacent in a window. In other words, group i may be mapped to CORESET i. As a result, adjacent TOs included in the same group may be mapped to the same TCI. For example, as in FIG. 9B, a case is assumed in which 6 PDCCH TOs are configured and 2 TCI states are configured in one window. And, it is assumed that a first to third PDCCH TO are grouped into a first group and a fourth to sixth PDCCH TO are grouped into a second group. In this case, in one window, a first TCI state may be mapped to a first PDCCH TO to a third PDCCH TO (i.e., a first group) and a second TCI state may be mapped to a fourth PDCCH TO to a sixth PDCCH TO (i.e., a second group).

Such a mapping method between a TO and a TCI may be applied to mapping between a TO and a TCI in the same window for a general case in which a PDCCH is repetitively transmitted at a different time (e.g., embodiment 1-3) or is partitively transmitted at a different time as well as for a case in the above-described embodiment 1-1. In other words, the above-described same mapping method between a TO and a TCI may be applied to all cases in which a different PDCCH candidate (to which a different TCI state is applied) is transmitted at a different TO in the same window.

The above-described embodiment 1-1 may be configured as a special case in embodiment 1-3 described later. In other words, for a method of configuring CORESET 1 and 2 and SS set 1 and 2 as in embodiment 1-3, a case in which CORESET 1 and 2 are configured to be the same (but, a CORESET ID and a TCI state defined in a CORESET are different) is not different from embodiment 1-1 that 1 CORESET, 2 SS sets and 2 TCIs are configured. Accordingly, as such, when CORESET 1 and 2 are configured to be the same in embodiment 1-3, the same PDCCH may be repetitively transmitted by the same method as a method of embodiment 1-1.

Embodiment 1-2) Two PDCCH Candidates Transmitting the Same DCI May be Defined/Configured in One (the Same) CORESET and One (the Same) SS Set FIG. 10 is a diagram which illustrates a method of transmitting and receiving downlink control information according to an embodiment of the present disclosure.

In reference to FIG. 10, PDCCH candidate 1 may be transmitted by using TCI state 1 and PDCCH candidate 2 may be transmitted by using TCI state 2. In addition, the same DCI may be transmitted through PDCCH candidate 1 and PDCCH candidate 2, respectively. In addition, both PDCCH candidate 1 and PDCCH candidate 2 may be (repetitively) transmitted at a specific period interval in a time domain.

In reference to FIG. 10, each PDCCH candidate may share the same CORESET and the same SS set and PDCCH candidate 1 and 2 may be FDM-ed. Both PDCCH candidate 1 and 2 may be defined/configured in one SS set and one CORESET mapped to that SS set. In this case, one of two TCI states defined/configured in a CORESET may be used in some PDCCH candidates and the remaining TCI states may be used in the remaining PDCCH candidates. For it, the PDCCH candidate to TCI mapping method may be referred to.

For example, when there are 4 PDCCH candidates of aggregation level=4, a first and third candidate are mapped to TCI state 1 and a second and fourth candidate are mapped to TCI state 2, so TCI states may be alternately mapped. Here, PDCCH candidate 1 may exist among a first and third candidate and PDCCH candidate 2 may exist among a second and fourth candidate. Alternatively, a first and second candidate are mapped to TCI state 1 and a third and fourth candidate are mapped to TCI state 2, so a front half candidate and a back half candidate may be mapped to a different TCI state. Here, PDCCH candidate 1 may exist among a first and second candidate and PDCCH candidate 2 may exist among a third and fourth candidate.

By expanding the above example, also similarly for N TCI states, N TCI states may be circularly mapped one by one as a candidate index increases. Alternatively, all candidates may be grouped by being divided into N adjacent candidates (adjacent candidate indexes) and N candidate groups and N TCI states may be mapped one-to-one.

In addition, in this method, a window that the same PDCCH is repetitively transmitted may be determined as every TO (transmission occasion) that a PDCCH is transmitted/received. In other words, PDCCH candidate 1 and 2 may be FDM-ed and repetitively transmitted at every PDCCH TO represented in slot n, n+P, n+2P, etc. FIG. 10 illustrates a case in which a SS set period is configured as P slot and one SS set is configured during one SS set period. In addition, a SS set may be configured in (contiguous) multiple slots within one SS set period or multiple SS sets may be also configured in one slot.

For example, a SS set may be configured in N (contiguous) slots during every period through a duration field (=N) defined in a SS set. A base station and UE may promise N slots configured in this way as one window. In this case, a TCI state may be mapped to each PDCCH TO through the above-described 'PDCCH TO and TCI mapping method in a window'. For example, for N=2, a SS set may be configured in the same form as in FIGS. 9A and 9B.

In another example, multiple SS sets may be configured in one slot through a higher layer field defined in a SS set configuration (e.g., a monitoringSymbolsWithinSlot field). For example, a SS set may be defined/configured per P slot and L SS sets may exist at a different time in a slot that a SS set is configured. In this case, a base station and UE may promise a window as 1 slot and a TCI state may be mapped to each PDCCH TO through the above-described 'PDCCH TO and TCI mapping method in a window'.

In addition, the above-described embodiment 1-2 may be configured as a special case in embodiment 1-3 described later. In other words, for a method of configuring CORESET 1 and 2 and SS set 1 and 2 as in embodiment 1-3, a case in which CORESET 1 and 2 are configured to be the same (but, a TCI state defined in a CORESET is different) and SS set 1 and 2 may be configured to be the same is not different from embodiment 1-2 that 1 CORESET, 1 SS set and 2 TCI states are configured. Accordingly, in this case, the same PDCCH may be repetitively transmitted by the same method as a method of embodiment 1-2.

In addition, similarly, embodiment 1-2 may be configured as a special case in embodiment 1-4. In other words, for a method of configuring CORESET 1 and 2 and SS set 1 as in embodiment 1-4, a case in which CORESET 1 and 2 are configured to be the same (but, a TCI state defined in a CORESET is different) is not different from embodiment 1-2.

In addition, embodiment 1-2 may be configured as a special case in embodiment 1-1. In other words, for a method of configuring CORESET 1 and SS set 1 and 2 as in embodiment 1-1, a case in which SS set 1 and 2 are configured to be the same (but, a CORESET ID and a TCI state of a CORESET used in each SS are different) is not different from embodiment 1-2 that 1 CORESET, 1 SS set and 2 TCIs are configured. Accordingly, in this case, the same PDCCH may be repetitively transmitted by the same method as a method of embodiment 1-2.

Embodiment 1-3) Two PDCCH Candidates Transmitting the Same DCI May be Defined/Configured in a Different CORESET and May be Defined/Configured in a Different SS Set FIG. 11 is a diagram which illustrates a method of transmitting and receiving downlink control information according to an embodiment of the present disclosure.

In reference to FIG. 11, PDCCH candidate 1 may be transmitted by using TCI state 1 and PDCCH candidate 2 may be transmitted by using TCI state 2. In addition, the same DCI may be transmitted through PDCCH candidate 1 and PDCCH candidate 2, respectively. In addition, both PDCCH candidate 1 and PDCCH candidate 2 may be (repetitively) transmitted at a specific period (p) interval in a time domain.

In reference to FIG. 11, CORESET 1 is mapped to SS set 1, CORESET 2 is mapped to SS set 2, PDCCH candidate 1 is transmitted through CORESET 1 and SS set 1 and PDCCH candidate 2 is transmitted through CORESET 2 and SS set 2. For such a configuration, a base station should inform UE that a corresponding CORESET group or SS set group was configured to transmit the same DCI. For example, an ID of SS set 2 (and/or 1) used to transmit the same DCI may be additionally configured in SS set 1 (and/or 2). Alternatively, a base station may indicate to UE that multiple SS sets are the same group and UE may recognize/ assume that SS sets belonging to the same group were configured to transmit the same DCI.

As a window configuration method that the same DCI is transmitted is the same as a configuration method in the above-described embodiment 1-1, a configuration method in embodiment 1-1 may be used as it is.

Figure 12:
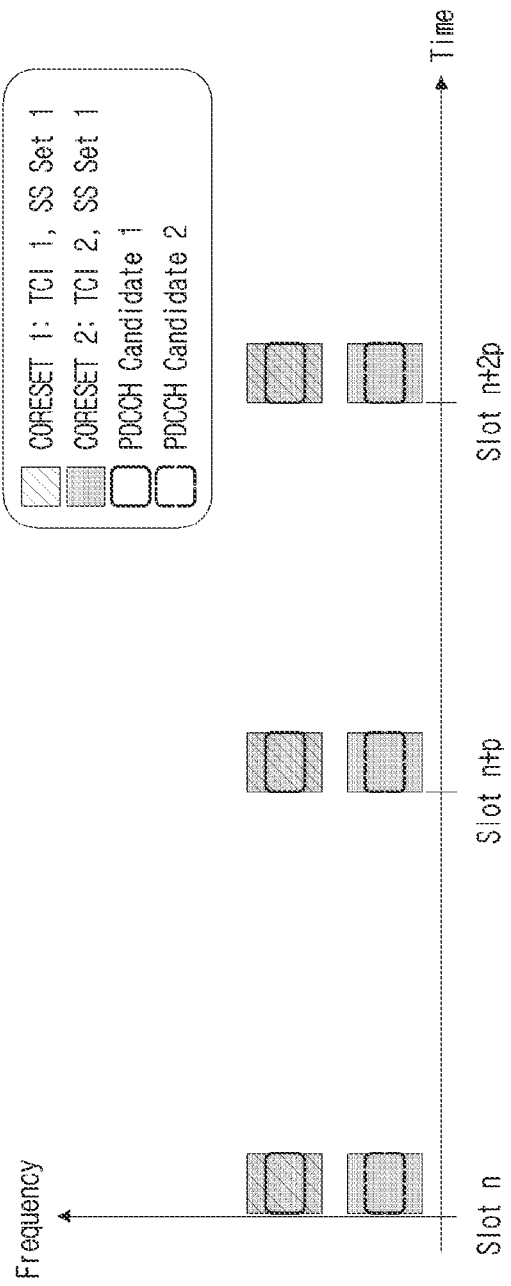
FIG. 12 is a diagram which illustrates a method of transmitting and receiving downlink control information according to an embodiment of the present disclosure.

Embodiment 1-4) Two PDCCH Candidates Transmitting the Same DCI are Defined/Configured in a Different CORESET, but May be Defined/Configured in One (the Same) SS Set FIG. 12 is a diagram which illustrates a method of transmitting and receiving downlink control information according to an embodiment of the present disclosure.

In reference to FIG. 12, PDCCH candidate 1 may be transmitted by using TCI state 1 and PDCCH candidate 2 may be transmitted by using TCI state 2. In addition, the same DCI may be transmitted through PDCCH candidate 1 and PDCCH candidate 2, respectively. In addition, both PDCCH candidate 1 and PDCCH candidate 2 may be (repetitively) transmitted at a specific period (p) interval in a time domain.

In reference to FIG. 12, two CORESETs having a different resource block (RB) may be mapped to one SS set and candidate 1 and 2 may be defined in CORESET 1 and CORESET 2, respectively.

In addition, in this method, a window that the same PDCCH is repetitively transmitted is determined as every TO (transmission occasion) that a PDCCH is transmitted/received. In other words, PDCCH candidate 1 and 2 may be FDM-ed and repetitively transmitted at every PDCCH TO shown in slot n, n+P, n+2P, etc.

FIG. 12 illustrates a case in which a SS set period is configured as P slot and one SS set is configured during one period. In addition, a SS set may be configured in (contiguous) multiple slots within one SS set period or multiple SS sets may be also configured in one slot.

For example, a SS set may be configured in N (contiguous) slots during every period through a duration field (=N) defined in a SS set. A base station and UE may promise N slots configured in this way as one window.

Hereinafter, a PDCCH TO and CORESET mapping method in a window is described.

There may be multiple PDCCH TOs in one window and a different CORESET may be mapped per each PDCCH TO. The following two methods may be considered by mapping of a PDCCH TO and a CORESET.

First, as a TO increases in a window, a CORESET may be sequentially mapped in a circular way. For example, when N TOs and M CORESETs defined in that SS set are indicated in a window, a i-th TO may be mapped to a i-th CORESET and for N>M, a first CORESET and a second CORESET may be sequentially mapped to a M+1-th TO and a M+2-th TO in a circular way. For example, as in FIG. 9A, a case is assumed in which 6 PDCCH TOs are configured and 2 CORESETs are configured in one window. In this case, in one window, a first PDCCH TO may be mapped to a first CORESET, a second PDCCH TO may be mapped to a second CORESET, a third PDCCH TO may be mapped to a first CORESET, a fourth PDCCH TO may be mapped to a second CORESET, a fifth PDCCH TO may be mapped to a first CORESET and a sixth PDCCH TO may be mapped to a second CORESET.

Alternatively, second, a group and a CORESET may be sequentially mapped circularly by grouping adjacent floor (N/M) or ceil(N/M) TOs in a window. In other words, group i may be mapped to CORESET i. As a result, adjacent TOs included in the same group may be mapped to the same CORESET. For example, as in FIG. 9B, a case is assumed in which 6 PDCCH TOs are configured and 2 CORESETs are configured in one window. And, it is assumed that a first to third PDCCH TO are grouped into a first group and a fourth to sixth PDCCH TO are grouped into a second group. In this case, in one window, a first PDCCH TO to a third PDCCH TO (i.e., a first group) may be mapped to a first CORESET and a fourth PDCCH TO to a sixth PDCCH TO (i.e., a second group) may be mapped to a second CORESET.

Such a mapping method between a TO and a CORESET may be applied to mapping between a TO and a CORESET in the same window for a general case in which a PDCCH is repetitively transmitted at a different time or is partitively transmitted at a different time as well as for a case in the above-described embodiment 1-4.

In another example, multiple SS sets may be configured in one slot through a higher layer field defined in a SS set (e.g., a monitoringSymbolsWithinSlot field). For example, a SS set may be defined in a period of P slots and L SS sets may exist at a different time in a slot that a SS set is configured. In this case, a base station and UE may promise a window as 1 slot. And, a CORESET may be mapped through the above-described 'PDCCH TO and CORESET mapping method in a window'.

In addition, embodiment 1-4 may be configured as a special case of embodiment 1-3. In other words, for a method of configuring CORESET 1 and 2 and SS set 1 and 2 as in embodiment 1-3, a case in which SS set 1 and 2 are configured to be the same is not different from proposal 1-4 that 2 CORESETs, 1 SS set and 2 TCIs are configured. Accordingly, in this case, the same PDCCH may be repetitively transmitted by the same method as a method of proposal 1-4.

Embodiment 2

Embodiment 2 describes a method that a plurality of base stations (i.e., MTRPs) partitively transmit the same PDCCH.

In addition, in the present disclosure, when a plurality of base stations (i.e., MTRPs) partitively transmit the same PDCCH, it means that one DCI is transmitted through one PDCCH candidate, but TRP 1 performs transmission in some resources that such a PDCCH candidate is defined and TRP 2 performs transmission in remaining resources. In this case, it may be also interpreted that a plurality of base stations transmit the same DCI. One PDCCH candidate partitively transmitted by a plurality of base stations (i.e., MTRPs) may be recognized/indicated to UE through the following configuration.

Hereinafter, for convenience of a description, it is assumed that two TRPs operate, but such an assumption does not limit a technical scope of the present disclosure.

Figure 13:
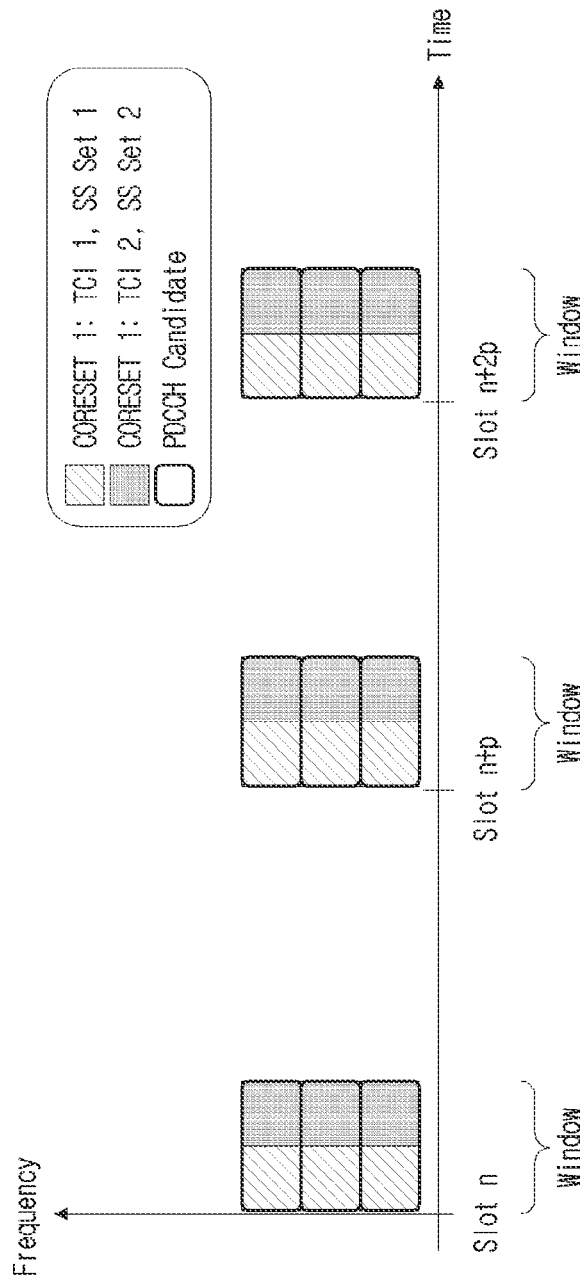
FIG. 13 is a diagram which illustrates a method of transmitting and receiving downlink control information according to an embodiment of the present disclosure.

Embodiment 2-1) One/the Same PDCCH Candidate Partitively Transmitted by a Plurality of Base Stations (i.e., MTRPs) are Defined/Configured in One (the Same) CORESET, but May be Defined/Configured in a Different SS Set FIG. 13 is a diagram which illustrates a method of transmitting and receiving downlink control information according to an embodiment of the present disclosure.

In reference to FIG. 13, PDCCH candidate 1 may be transmitted by using TCI state 1 and PDCCH candidate 2 may be transmitted by using TCI state 2. And, PDCCH candidate 1 and PDCCH candidate 2 may be combined to configure a single PDCCH candidate that one DCI is transmitted. In addition, all PDCCH candidates generated in this way may be (repetitively) transmitted at a specific period (p) interval in a time domain.

This method may be configured by a method similar to the above-described embodiment 1-1 and one PDCCH candidate may be transmitted/received through a different SS set existing in the same window. For example, UE may try decoding by assuming a PDCCH candidate of aggregation level=A1 of SS set 1 and a PDCCH candidate of aggregation level=A2 of SS set 2 in the same window as one PDCCH candidate of aggregation level=A1+A2 without treating them as a different PDCCH candidate. Through such a method, a variety of aggregation levels other than the existing aggregation level may be supported.

But, because there are various aggregation levels or PDCCH candidates in each SS set, a method of generating one candidate with a candidate of two SS sets without any constraints may increase terminal implementation complexity. To solve it, a candidate combination of two SS sets generating one PDCCH candidate may be limited. For example, a candidate of two SS sets generating one PDCCH candidate may be limited to the same aggregation level and/or may be limited to the same PDCCH candidate number (or index). Alternatively, for example, a standard set (e.g., set 1) of two SS sets may be configured and one PDCCH candidate may be generated by combining a PDCCH candidate of set 1 and a set 2 PDCCH candidate configured as an aggregation level or less of that PDCCH candidate.

Embodiment 2-1 may be configured as a special case of embodiment 2-3. In other words, for a method of configuring CORESET 1 and 2 and SS set 1 and 2 as in embodiment 2-3, a case in which CORESET 1 and 2 are configured to be the same (but, a CORESET ID and a TCI state defined in a CORESET are different) is not different from embodiment 2-1 that 1 CORESET, 2 SS sets and 2 TCIs are configured. Accordingly, in this case, the same PDCCH may be repetitively transmitted by the same method as a method of embodiment 2-1.

Embodiment 2-2) One PDCCH Candidate Partitively Transmitted by a Plurality of Base Stations (i.e., MTRPs) May be Defined/Configured in One (the Same) CORESET and One (the Same) SS Set A PDCCH candidate defined in one CORESET and one SS set may be partitively transmitted by a plurality of base stations. Here, some resources of frequency/time resources configuring one PDCCH candidate may be transmitted/received by using one of two TCI states configured in a CORESET and the remaining resources may be transmitted/received by using the other TCI state.

Figure 14:
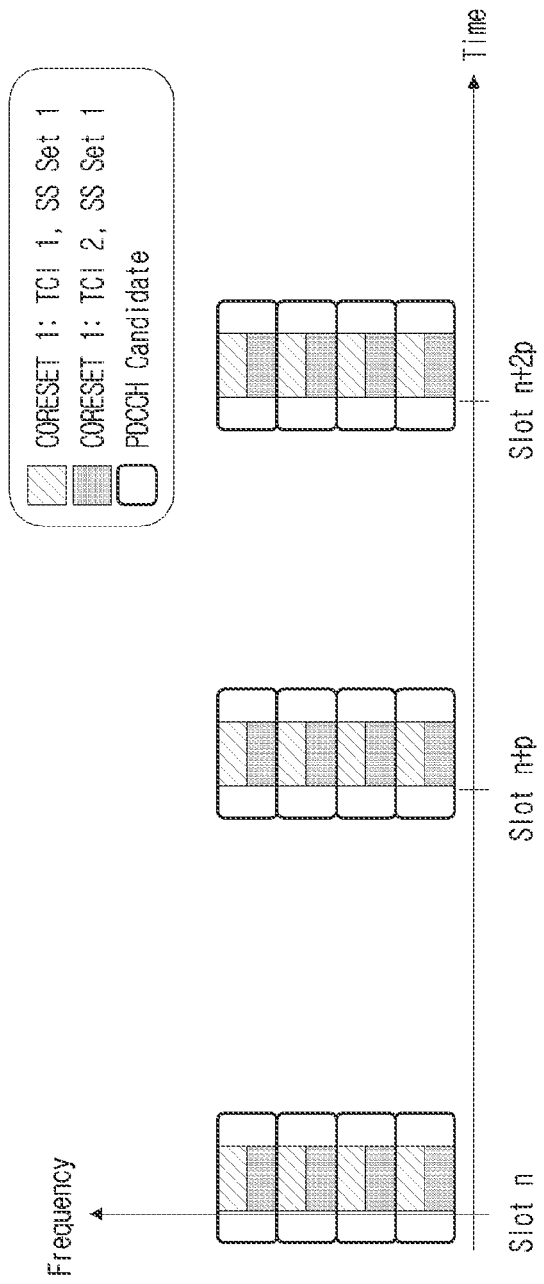
FIG. 14 is a diagram which illustrates a method of transmitting and receiving downlink control information according to an embodiment of the present disclosure.

FIG. 14 is a diagram which illustrates a method of transmitting and receiving downlink control information according to an embodiment of the present disclosure.

FIG. 14 shows an example that a frequency resource configuring one PDCCH candidate is divided and a different TCI state is mapped. All PDCCH candidates may be (repetitively) transmitted at a specific period (P) interval in a time domain.

For example, a frequency resource configuring a PDCCH candidate of aggregation level=4 may be divided in a unit of a control channel element (CCE). And, a first and third CCE are mapped to TCI state 1 and a second and fourth CCE are mapped to TCI state 2, so TCI states may be mapped alternately. Alternatively, a first and second CCE are mapped to TCI state 1 and a third and fourth CCE are mapped to TCI state 2, so a front half CCE and a back half CCE may be mapped to a different TCI state. By generalizing it, similarly for N TCI states, as a CCE index increases, N TCIs may be circularly mapped one by one. Alternatively, all CCEs may be divided and grouped into N adjacent CCEs (adjacent CCE indexes) and N CCE groups and N TCI states may be mapped one-to-one.

Because a PDCCH candidate of aggregation level=1 may not be divided in a unit of a CCE, a resource element group (REG) bundle size may be configured as less than 6 REGs and may be divided in a unit of a REG bundle. In addition, regardless of an aggregation level, a TCI state may be mapped by dividing a resource in a unit of a REG bundle. In this case, the TCI state and CCE mapping method may be equally applied to mapping between a TCI state and a REG bundle. For example, when a PDCCH candidate of aggregation level=1 is configured with 3 REG bundles (with bundle size=2), a first and third REG bundle are mapped to TCI state 1 and a second REG bundle is mapped to TCI state 2, so TCI states may be alternately mapped. Alternatively, a first and second REG bundle are mapped to TCI state 1 and a third REG bundle is mapped to TCI state 2, so a front half REG bundle and a back half REG bundle may be mapped to a different TCI state.

Alternatively, for a PDCCH candidate of Aggregation level=1, as one TRP transmits one PDCCH candidate, but a different TRP transmits different PDCCH candidates (of Aggregation level=1), diversity gain may be increased. For example, when there are 4 PDCCH candidates of Aggregation level=1, an even/odd candidate may be mapped to TCI state 1 as TRP 1 transmits an even/odd candidate and an odd/even candidate may be mapped to TCI state 2 as TRP 2 transmits an odd/even candidate conversely.

According to a current standard, when precoder granularity configured in a CORESET is configured by contiguous RBs (i.e., allContiguousRBs) and a wideband DMRS is configured, UE figures out a REG bundle configuring that PDCCH candidate when estimating a channel for one PDCCH candidate. And, UE assumes that a DMRS to which the same precoder is applied is transmitted to contiguous frequency resources including that REG bundle in that CORESET. As such, channel estimation accuracy is improved by using a REG bundle configuring a PDCCH candidate together with a DMRS of contiguous different REGs for that REG bundle.

But, if a frequency resource configuring one CORESET is mapped to a different TCI state as in the present embodiment, an wideband DMRS operation method is no longer valid. This is because some resources of contiguous frequency resources including a REG bundle are mapped to TCI state 1 and the remaining are mapped to TCI state 2, so a channel that a DMRS is transmitted is different.

Accordingly, in this case, when an wideband DMRS is configured, an operation of UE should be modified as follows. When estimating a channel for one PDCCH candidate, UE figures out a REG bundle configuring that PDCCH candidate. And, UE may assume that a DMRS to which the same precoder is applied is transmitted to contiguous frequency resources including that REG bundle "among frequency resources mapped to the same TCI state and that REG bundle" in that CORESET. Even when a plurality of TRPs partitively transmit a time resource configuring one PDCCH candidate as in FIG. 15 described later, the above-proposed UE operation may be applied in configuring an wideband DMRS. In addition, such a method may be also extended and applied to a case of the above-described embodiment 1-2. For a case of embodiment 2-4 described later, one PDCCH candidate is transmitted through two CORESETs, so UE may figure out a REG bundle configuring that PDCCH candidate and assume that a DMRS to which the same precoder is applied is transmitted to contiguous frequency resources including that REG bundle in a CORESET to which that REG bundle belongs. For example, if a PDCCH candidate is configured with 3 REG bundles, UE may assume that a DMRS to which the same precoder is applied is transmitted to contiguous frequency resources including that bundle in a CORESET to which bundle i belongs when estimating a channel of bundle i (i=1,2,3).

Figure 15:
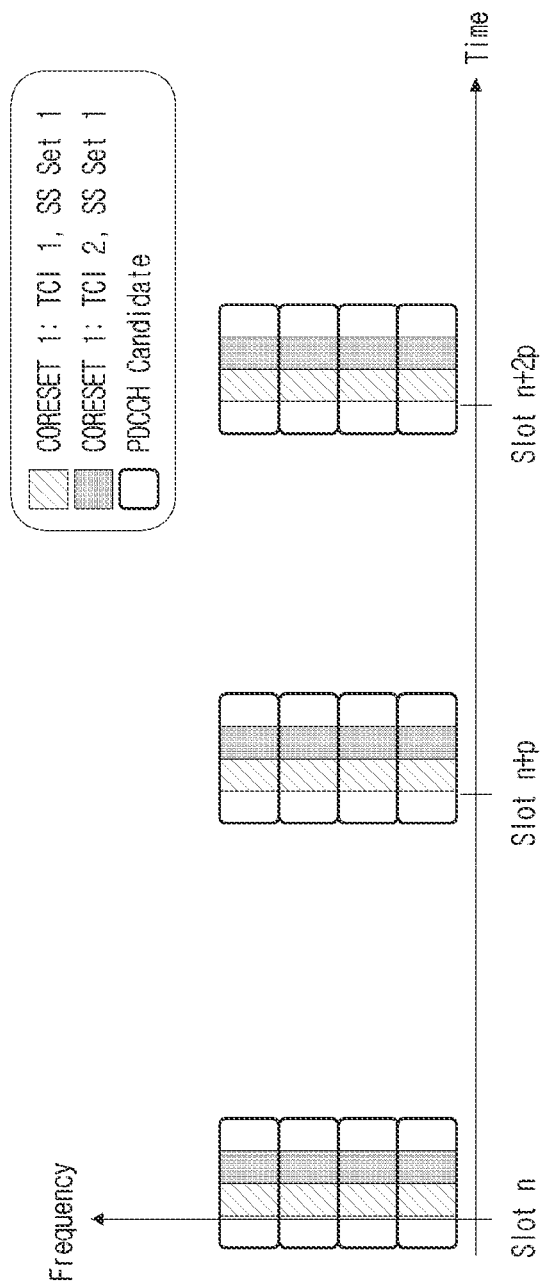
FIG. 15 is a diagram which illustrates a method of transmitting and receiving downlink control information according to an embodiment of the present disclosure.

FIG. 15 is a diagram which illustrates a method of transmitting and receiving downlink control information according to an embodiment of the present disclosure.

FIG. 15 shows a case in which a different TCI state is mapped by dividing a time resource configuring one PDCCH candidate. All PDCCH candidates may be (repetitively) transmitted at a specific period (P) interval in a time domain.

FIG. 15 is an example that one CORESET is defined as a CORESET duration of two symbols. And, two symbols configuring one PDCCH candidate may be mapped to a different TCI state. In this case, mapping between a TCI and a symbol may be defined/configured similarly to the above-described TCI and CCE mapping method.

For mapping between a REG and a REG bundle and between a REG bundle and a CCE, a resource of a PDCCH candidate may be configured by applying the existing method as it is. However, when estimating a channel through an actual DMRS, the existing REG bundle may not be used as it is. It is because a symbol configuring a REG bundle is mapped to a different TCI. Accordingly, when estimating a channel through an actual DMRS, UE may reconfigure a REG bundle only with a symbol mapped to the same TCI state among symbols configuring the existing REG bundle and perform channel estimation in a unit of a reconfigured REG bundle.

In addition, in this method, a window that the same PDCCH is partitively transmitted is determined as every TO (transmission occasion) that a PDCCH is transmitted/received. In other words, some resources of resources configuring one PDCCH candidate are transmitted/received by using TCI state 1 per PDCCH TO shown in slot n, n+P, n+2P and the remaining resources are transmitted/received by using TCI state 2. In other words, two TRPs are partitively transmitted.

In addition, embodiment 2-2 may be configured as a special case of embodiment 2-3. In other words, for a method of configuring CORESET 1 and 2 and SS set 1 and 2 as in embodiment 2-3, a case in which CORESET 1 and 2 are configured to be the same (but, a TCI state defined in a CORESET is different) and SS set 1 and 2 may be configured to be the same is not different from embodiment 2-2 that 1 CORESET, 1 SS set and 2 TCI states are configured. Accordingly, in this case, the same PDCCH may be partitively transmitted by the same method as a method of embodiment 2-2. Similarly, embodiment 2-2 may be configured as a special case of embodiment 2-4. For a method of configuring CORESET 1 and 2 and SS set 1 as in proposal 2-4, a case in which CORESET 1 and 2 are configured to be the same (but, a TCI state defined in a CORESET is different) is not different from embodiment 2-2. In addition, embodiment 2-2 may be configured as a special case of embodiment 2-1. In other words, for a method of configuring CORESET 1 and SS set 1 and 2 as in embodiment 2-1, a case in which SS set 1 and 2 are configured to be the same (but, a CORESET ID and a TCI state of a CORESET used in each SS are different) is not different from embodiment 2-2 that 1 CORESET, 1 SS set and 2 TCIs are configured. Accordingly, in this case, the same PDCCH may be repetitively transmitted by the same method as a method of embodiment 2-2.

Figure 16:
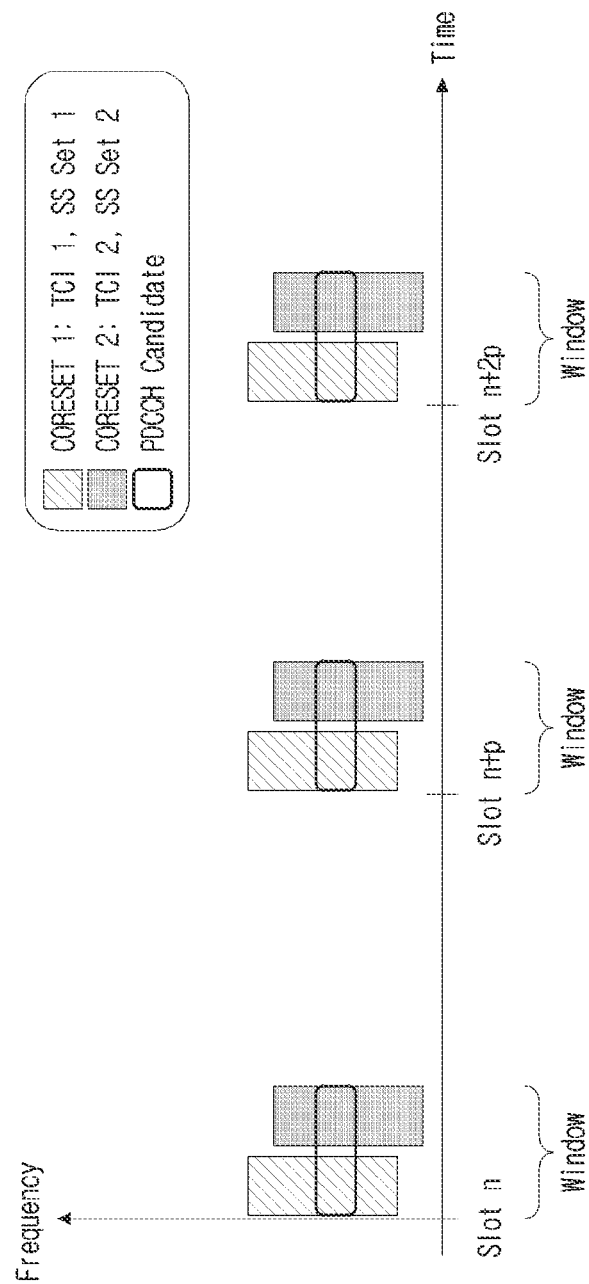
FIG. 16 is a diagram which illustrates a method of transmitting and receiving downlink control information according to an embodiment of the present disclosure.

Embodiment 2-3) One PDCCH Candidate Partitively Transmitted by a Plurality of Base Stations (i.e., MTRPs) May be Defined/Configured in a Plurality of CORESETs and May be Defined/Configured in a Plurality of SS Sets FIG. 16 is a diagram which illustrates a method of transmitting and receiving downlink control information according to an embodiment of the present disclosure.

In reference to FIG. 16, CORESET 1 may be mapped to SS set 1 and CORESET 2 may be mapped to SS set 2. And, one PDCCH candidate may be transmitted/received through a different SS set existing in the same window.

For example, UE may try decoding by assuming a PDCCH candidate of aggregation level=A1 of SS set 1 and a PDCCH candidate of aggregation level=A2 of SS set 2 in the same window as one PDCCH candidate of aggregation level=A1+A2 without treating them as a different PDCCH candidate. As embodiment 2-3 differs only in mapping between a CORESET and a SS set in comparison with the above-described embodiment 2-1, a detailed proposal of proposal 2-1 may be applied as it is.

Here, a base station may indicate to UE that multiple SS sets (e.g., SS set 1 and 2) are the same group and UE may recognize/assume that SS sets belonging to the same group are configured to partitively transmit the same DCI (and/or the same PDCCH candidate).

Figure 17:
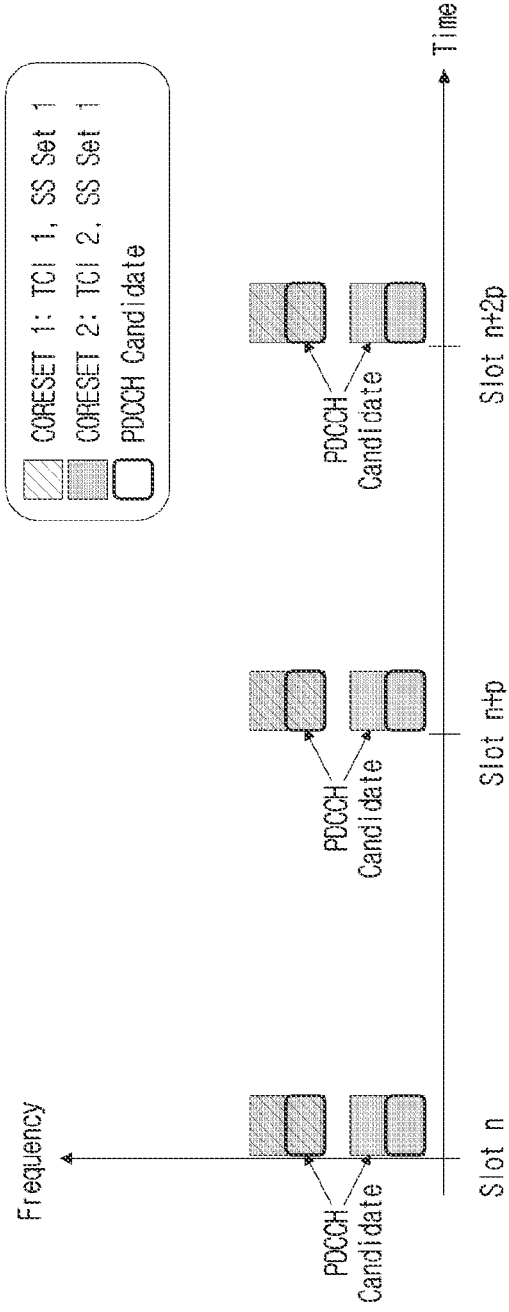
FIG. 17 is a diagram which illustrates a method of transmitting and receiving downlink control information according to an embodiment of the present disclosure.

Embodiment 2-4) One PDCCH Candidate Partitively Transmitted by a Plurality of Base Stations (i.e., MTRPs) is Defined/Configured in a Plurality of CORESETs, but May be Defined/Configured in One SS Sets FIG. 17 is a diagram which illustrates a method of transmitting and receiving downlink control information according to an embodiment of the present disclosure.

In reference to FIG. 17, two CORESETS having a different RB resource may be mapped to one SS set. And, one PDCCH candidate may be generated by combining a PDCCH candidate of CORESET 1 and a PDCCH candidate of CORESET 2. For example, TRP 1 and 2 may transmit a PDCCH through CORESET 1 and 2 respectively and UE may combine a PDCCH candidate of Aggregation level=A1 in CORESET 1 and a PDCCH candidate of Aggregation level=A2 in CORESET 2 to assume it as one PDCCH candidate of aggregation level=A1+A2 and try decoding.

But, because there are various aggregation levels or PDCCH candidates in each CORESET, a method of generating one candidate with a candidate of two CORESETs without any constraints increases terminal implementation complexity. To solve it, a PDCCH candidate combination of two CORESETs generating one PDCCH candidate may be limited. Such a limit may be applied similarly to a method of limiting a PDCCH candidate combination of two SS sets in the above-described embodiment 2-1 method. In other words, embodiment 2-4 is similar to the embodiment 2-1, so detailed proposals of embodiment 2-1 may be applied. But, embodiment 2-4 generates one PDCCH candidate by aggregating a plurality of multiplexed PDCCH candidates to a frequency resource instead of a time resource, so it may be modified and applied accordingly.

In addition, in this method, a window that the same PDCCH is partitively transmitted is determined as every TO (transmission occasion) that a PDCCH is transmitted/received. In other words, PDCCH candidate 1 may be transmitted/received by using TCI state 1 (through CORESET 1) in some resources of resources configuring one PDCCH candidate per PDCCH TO shown in slot n, n+P, n+2P and PDCCH candidate 2 may be transmitted/received by using TCI state 2 (through CORESET 2) in the remaining resources. In other words, two TRPs divide a PDCCH candidate into PDCCH candidate 1 and PDCCH candidate 2 and transmit it.

In addition, embodiment 2-4 may be configured as a special case of embodiment 2-3. In other words, for a method of configuring CORESET 1 and 2 and SS set 1 and 2 as in embodiment 2-3, a case in which SS set 1 and 2 are configured to be the same is not different from embodiment 2-4 that 2 CORESETs, 1 SS set and 2 TCIs are configured. Accordingly, in this case, a PDCCH may be partitively transmitted by the same method as a method of embodiment 2-4.

In addition, for SS set(s) that a plurality of base stations (i.e., MTRPs) partitively transmit the same PDCCH (i.e., for the above-described embodiment 2-1 to 2-4), it may be indicated to UE that the same PDCCH is partitively transmitted only for some DCI formats/SS types/RNTIs defined in a SS set and it is transmitted for the remaining from one TRP as in the existing method. For example, partitive transmission may be indicated only for format 1-0 (or 1-1) for a SS set that both DCI format 1-0 and 1-1 are defined. Alternatively, partitive transmission may be indicated only for a common SS (or an UE specific SS) among an UE specific SS and a common SS. Alternatively, the same PDCCH may be partitively transmitted only for DCI CRC masked with a specific RNTI (e.g., RNTIs excluding a C-RNTI, a MCS-C-RNTI, a CS-RNTI).

A base station may inform UE of whether a plurality of base stations will partitively transmit the same PDCCH (a case for the above-described embodiment 2) or repetitively transmit the same PDCCH (a case for the above-described embodiment 1) through higher layer signaling.

Hereinafter, a method proposed in the present disclosure may be applied to both a case in which a plurality of base stations (i.e., MTRPs) repetitively transmit the same PDCCH (a case for the above-described embodiment 1) and a case in which a plurality of base stations (i.e., MTRPs) partitively transmit the same PDCCH (a case for the above-described embodiment 2).

In the present disclosure, a TO (or a PDCCH TO) may mean each channel transmitted at a different time when multiple channels (i.e., i) for repeat transmission, multiple PDCCH candidates, ii) for partitive transmission, multiple combined PDCCH candidates or multiple PDCCH candidates before combination) are TDM-ed, may mean each channel transmitted to a different frequency/RB when multiple channels are FDM-ed or may mean each channel transmitted to a different layer/beam/DMRS port when multiple channels are SDM-ed. One TCI state may be mapped to each TO.

When the same channel is repetitively transmitted (e.g., a case of embodiment 1), complete DCI/data/uplink control information (UCI) may be transmitted to one TO and a receiving end may increase a reception success rate by receiving multiple TOs. When one channel is partitively transmitted to multiple TOs (e.g., a case of embodiment 2), part of DCI/data/UCI is transmitted to one TO and only when a reception end should receive all multiple TOs, it may receive complete DCI/data/UCI by collecting partitioned DCI/data/UCI.

Embodiment 3

This embodiment is about a case in which one same DCI is repetitively transmitted through a downlink control channel (e.g., a PDCCH) from multiple TRPs (MTRPs) and TCI information is not included in the one same DCI.

When a TCI field is not included in one DCI transmitted from a single TRP (STRP) not by repeat transmission of same DCI/PDCCH from MTRPs, a TCI state of a PDSCH scheduled by the DCI may follow a TCI state associated with a CORESET that the DCI is received.

When TCI information is included in DCI repetitively transmitted from MTRPs, a TCI state associated with a downlink data channel (e.g., a PDSCH) scheduled by the DCI may be clearly determined based on TCI information included in the DCI.

Meanwhile, when TCI information is not included in DCI repetitively transmitted from MTRPs, a method of determining a TCI state associated with a downlink data channel scheduled by the DCI is not clearly defined.

Hereinafter, various examples for solving a problem of the ambiguity are described. In particular, when a TCI is not included in DCI repetitively transmitted from MTRPs, a method of determining TCI information which will be applied to a downlink data channel (e.g., a PDSCH) transmitted from a single TRP (STRP) is described.

The following examples assume a case in which there are a plurality of CORESETs associated with one same DCI (or downlink control channel) transmitted from MTRPs and each TCI information is associated with each CORESET, or a case in which there is 1 CORESET associated with the one same DCI (or downlink control channel) and a plurality of TCI information is associated with 1 CORESET. In other words, they assume a case in which when one same DCI is transmitted through a downlink control channel from MTRPs, a plurality of TCI information is preconfigured or predefined based on a CORESET associated with the downlink control channel transmission.

For example, a higher layer parameter ControlResourceSet IE (information element) may be used to configure a time/frequency control resource set (CORESET). For example, the control resource set (CORESET) may be related to detection and reception of downlink control information. The ControlResourceSet IE may include one or more of a CORESET-related ID (e.g., controlResourceSetID), an index of a CORESET pool for a CORESET (e.g., CORESETPoolIndex), a time/frequency resource configuration of a CORESET, or CORESET-related TCI information, etc. For example, an index of a CORESET pool (e.g., CORESETPoolIndex) may be configured as 0 or 1. In the above-described examples of the present disclosure, a CORESET group may correspond to a CORESET pool and a CORESET group ID may correspond to a CORESET pool index (e.g., CORESETPoolIndex). ControlResourceSet (i.e., CORESET) may be configured through higher layer signaling (e.g., RRC signaling).

In addition, in the following examples, a CORESET identifier or a CORESET ID may include a search space set (SS set) identifier or a SS set ID. In other words, one CORESET may include one or more SSs and may define one or more SSs as a SS set.

In addition, in the following examples, when one same DCI (or downlink control channel (e.g., PDCCH)) is transmitted from MTRPs, a SFN (single frequency network) method includes an operation that MTRPs transmit the same DCI (or PDCCH) at the same time and a non-SFN method includes an operation that MTRPs repetitively transmit the same DCI (or PDCCH) (in predetermined order) in a different time resource. For example, in a SFN method, a plurality of TCI information may be associated with 1 CORESET and in a non-SFN method, each TCI information may be associated with each of a plurality of CORESETs. It is assumed that the following examples may be applied to both a SFN method and a non-SFN method and a terminal may obtain a plurality of TCI information associated with CORESET(s) associated with one DCI (or PDCCH) transmitted from MTRPs.

In the following description, a term of repeat transmission of one same DCI (or PDCCH) from MTRPs is mainly used for clarity and repeat transmission of the same DCI/PDCCH from MTRPs may include both a SFN method and a non-SFN method. Furthermore, it should be understood that repeat transmission of the same DCI/PDCCH from MTRPs also includes a method that MTRPs transmit the same DCI/PDCCH respectively or partitively transmit one DCI/PDCCH.

In addition, repeat transmission of the same DCI/PDCCH, unless specifically limited, may include repeat transmission from MTRPs and repeat transmission from a single TRP (STRP).

In addition, when the same DCI/PDCCH is repetitively transmitted, a terminal may increase a DCI/PDCCH reception/decoding success rate through two methods (e.g., a soft combining method, and a multi-change method).

First, in a soft combining method, UE may increase a decoding success rate through soft combining for a plurality of the same PDCCHs received (i.e., stored in a memory/a buffer). It is a method similar to that of increasing a decoding success rate by performing soft combining for a retransmitted PDSCH and an initial PDSCH received by UE when retransmitting a PDSCH. For such UE, a base station may inform UE of a PDCCH TO (or a window) that the same PDCCH is repetitively transmitted and UE may perform soft combining for an indicated PDCCH TO.

Second, in a multi-chance method, UE may independently decode each of multiple PDCCHs without performing soft combining. In this case, it may not obtain benefits by soft combining, but UE implementation is simplified and only success in decoding at least one PDCCH of multiple received PDCCHs is needed, so a reception success rate may be increased. A base station does not need to inform UE of a repetitive PDCCH TO (or window) that the same PDCCH is transmitted and UE may independently decode each PDCCH TO. For example, a base station transmits the same PDCCH to PDCCH TO 1 and TO 2, but UE may individually decode TO 1 and TO 2 without knowing that the same PDCCH is transmitted to TO 1 and TO 2. If UE succeeds in PDCCH decoding both at TO 1 and TO 2, UE may know that scheduling information included in DCI of TO 1 overlaps with scheduling information included in DCI of TO 2. In this case, UE may know that the same DCI is repetitively transmitted at TO 1 and TO 2 after DCI decoding success. UE may ignore or discard remaining DCI excluding one DCI. If UE succeeds in DCI decoding only at TO 1, it may not know that DCI is transmitted at TO 2 and conversely, if UE succeeds in DCI decoding only at TO 2, it may not know that DCI is transmitted at TO 1.

In other words, in the following examples, a method in which the same DCI/PDCCH is repetitively transmitted from MTRPs is not limited to a SFN method or a non-SFN method and a method in which reception/decoding for one or more DCI/PDCCHs is performed in a terminal is not limited to a soft combining method or a multi-chance method.

Embodiment 3-1

In case of DCI/PDCCH repeat transmission from MTRPs, there are a plurality of TCI states associated with CORESET(s) that the same DCI is received. In addition, one TCI state is associated with a PDSCH which is transmitted from a single TRP (STRP). Here, when PDSCH transmission from a STRP is scheduled by the same DCI repetitively transmitted from MTRPs and TCI information is not included in the same DCI, which TCI state among a plurality of TCI states associated with a CORESET associated with repetitively transmitted DCI/PDCCH will be applied to STRP PDSCH transmission is unclear.

For example, DCI repetitively transmitted from MTRPs is transmitted through one CORESET, but there are 2 TCIs in that CORESET, so the same DCI may be received both in TCI state 1 and TCI state 2. Alternatively, the same DCI repetitively transmitted from MTRPs may be received through CORESET 1 using TCI state 1 and CORESET 2 using TCI state 2.

As a more specific example, in a soft combining method, when DCI decoding is successful, there are multiple TCI states connected to multiple PDCCH TOs (i.e., PDCCH candidates) to be soft-combined.

In a multi-chance method, UE independently decodes a repetitively transmitted PDCCH TO respectively, so it may succeed or fail in decoding with a possibility of a target BLER (Block Error Ratio) at each PDCCH TO. For example, if the same DCI/PDCCH is transmitted 2 times by using TCI state 1 in slot 1 and using TCI state 2 in slot 2, UE may experience one of the following three cases.

Case 1: Succeed in DCI decoding in slot 1 and fail in DCI decoding in slot 2

Case 2. Fail in DCI decoding in slot 1 and succeed in DCI decoding in slot 2

Case 3. Succeed in DCI decoding in slot 1 and succeed in DCI decoding in slot 2

In Case 1, UE may recognize TCI state 1 as a CORESET TCI and use it for PDSCH reception. In Case 2, UE may recognize TCI state 2 as a CORESET TCI and use it for PDSCH reception. In Case 3, UE recognizes both TCI state 1 and 2 as a CORESET TCI, so which TCI will be used for PDSCH reception is unclear. In other words, UE differently determines a PDSCH TCI as TCI state 1 or 2 according to a situation and a base station may not clearly determine which TCI state will be used to transmit a PDSCH because it does not know whether it belongs to Case 1, 2, or 3.

Embodiment 3-1-1

In a soft combining method, a base station and UE may predetermine and pre-share that a PDSCH is received by using one specific TCI state among a plurality of TCI states associated with DCI reception. Such a method may be applied to a case in which MTRPs repetitively transmit the same DCI/PDCCH and may be also applied to a case in which MTRPs partitively transmit the same DCI/PDCCH.

Here, the same DCI/PDCCH repeat transmission from MTRPs may include both a SFN method and a non-SFN method.

For example, one specific TCI state may be defined as a first TCI state, a last TCI state, a TCI state of the lowest (or highest) index or a TCI state associated with a CORESET of the lowest (or highest) index among a plurality of TCIs.

In a multi-chance method, a TCI state which will be used for PDSCH reception other than a CORESET TCI state in a CORESET may be separately configured. For example, when the same DCI is transmitted through CORESET 1 and CORESET 2, a PDSCH TCI state field may be defined respectively in CORESET 1 and 2 and configured as TCI state 1 with the same value. As a result, UE may receive a PDSCH by using TCI state 1 for the above-described Case 1, 2, 3. Alternatively, if there is no PDSCH TCI state field in a CORESET, a PDSCH may be received by using a TCI state of that CORESET and if there is a PDSCH TCI state field, a PDSCH may be received by using that value. For example, if a PDSCH TCI state field is not configured in CORESET 1 using TCI state 1 and a PDSCH TCI state is configured as TCI state 1 in CORESET 2 using TCI state 2, a PDSCH may be received by using TCI state 1 for the above-described Case 1, 2, 3.

Embodiment 3-1-2

In a multi-chance method, if a base station configures or indicates to UE a set of PDCCH TOs that the same DCI is repetitively transmitted and UE succeeds in receiving even one DCI in a corresponding set, a PDSCH may be received by using a TCI state used for a specific PDCCH TO in a set. For example, a set of PDCCH TOs may be configured by higher layer (e.g., RRC) signaling to UE and UE may know in advance the number of TOs in a TO set and the order of each TO.

For example, as in the above-described FIG. 8 and FIG. 11, if a PDCCH TO is TDM-ed in a window, PDCCH TOs in a window may form one set. In other words, as UE configures a window to UE, UE may receive a configuration or an indication for a set of PDCCH TOs. In this case, a TCI state used for one specific PDCCH TO regardless of which PDCCH TO in a window receives DCI may be always used for PDSCH reception. For example, the one specific PDCCH TO may be a first TO (or transmitted first) in a time domain or a TO transmitted last in a time domain in a TO set.

As an additional example, when a PDCCH TO is FDM-ed in the same time as in FIG. 10, a PDCCH TO using TCI state 1 and a PDCCH TO using TCI state 2 may form one set. In this case, a TCI state used for one specific PDCCH TO regardless of which PDCCH TO in a set receives DCI may be always used for PDSCH reception. For example, the one specific PDCCH TO may be a first TO (or using a first TCI state) or a last TO (or using a last TCI state) in a TO set.

As an additional example, when a PDCCH TO is FDM-ed in the same time as in FIG. 12, a PDCCH TO of CORESET 1 and a PDCCH TO of CORESET 2 defined in the same time may form one set. In this case, a TCI state used for one specific PDCCH TO regardless of which PDCCH TO in a set receives DCI may be always used for PDSCH reception. For example, the one specific PDCCH TO may be a first ID (or corresponding to the lowest CORESET ID (or SS set ID)) or a last TO (or corresponding to the highest CORESET ID (or SS set ID)) in a TO set.

Embodiment 3-1-3

In a multi-chance method, if a base station configures or indicates to UE a set of PDCCH TOs that the same DCI is repetitively transmitted and UE succeeds in receiving even one DCI in a corresponding set, a PDSCH may be received by using a specific TCI state.

For example, the specific TCI state may be indicated by a base station to UE through MAC CE or RRC signaling.

As an additional example, the specific TCI state may be determined as a default TCI state (or a default beam). For example, a TCI state of a CORESET that a lowest CORESET ID (or SS set ID) in a latest slot that a search space is configured is configured may be determined as a default TCI state.

Here, a default TCI state may be defined as a TCI state used when time until UE receives a PDSCH after receiving DCI (i.e., DCI to PDSCH time) is less than a specific threshold value reported by UE to a base station as its capability.

In more detail, a determination of a default TCI state (or a default beam) may be defined as follows.

For both the cases when tci-PresentInDCI is set to 'enabled' and tci-PresentInDCI is not configured in RRC connected mode, if the offset between the reception of the DL DCI and the corresponding PDSCH is less than the threshold timeDurationForQCL, the UE may assume that the DM-RS ports of PDSCH of a serving cell are quasi co-located with the RS(s) with respect to the QCL parameter(s) used for PDCCH quasi co-location indication of the CORESET associated with a monitored search space with the lowest CORESET-ID in the latest slot in which one or more CORESETs within the active BWP of the serving cell are monitored by the UE.

Here, the latest slot may correspond to the most recently slot that a PDCCH monitoring occasion (MO) exists among slots before DCI is received.

Embodiment 3-2

This embodiment includes a new method about a time reference for determining a default TCI state (or a default beam) when the same DCI/PDCCH is repetitively transmitted (i.e., when a terminal may receive/detect a plurality of same DCI/PDCCHs at a different time position).

Hereinafter, for clarity of a description, it is described by assuming a case in which the same DCI/PDCCH is repetitively transmitted from MTRPs, but a scope of the present disclosure is not limited thereto. In other words, this embodiment may be applied to a case in which the same DCI/PDCCH is repetitively transmitted from MTRPs and may be also applied to a case in which the same DCI/PDCCH is repetitively transmitted from a single TRP (STRP).

In addition, this embodiment may be applied to a case in which a TCI field is included in DCI and may be also applied to a case in which a TCI field is not included in DCI. In other words, this embodiment includes a method of clearly determining a default TCI state based on a relation between DCI and PDSCH timing regardless of whether a TCI field is included in DCI.

Figure 18:
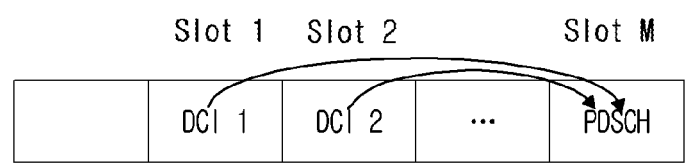
FIG. 18 is a diagram for describing a relation between DCI and a PDSCH to which the present disclosure may be applied.

FIG. 18 is a diagram for describing a relation between DCI and a PDSCH to which the present disclosure may be applied.

The same DCI/PDCCH may be transmitted at a different time (e.g., slot 1 and slot 2) by the same DCI/PDCCH repeat transmission. In other words, DCI 1 in slot 1 and DCI 2 in slot 2 may include the same information. For example, DCI 1 may include information scheduling a PDSCH transmitted in slot M and DCI 2 may also include information scheduling a PDSCH transmitted in slot M in the same way.

DCI/PDCCH in slot 1 may be transmitted in CORESET 1 and DCI/PDCCH in slot 2 may be transmitted in CORESET 2. CORESET 1 and CORESET 2 may belong to the same CORESET Pool or may belong to a different CORESET Pool. DCI/PDCCH may include or may not include a TCI field.

When DCI/PDCCH does not include a TCI field, a TCI state associated with a CORESET with which DCI/PDCCH is associated may be applied to a PDSCH scheduled by corresponding DCI/PDCCH. If a PDSCH in slot M is a PDSCH transmitted from a single TRP (STRP), it needs to define which of a TCI state associated with DCI/PDCCH in slot 1 or a TCI state associated with DCI/PDCCH in slot 2 will be applied to a PDSCH in slot M.

As described above, when time until UE receives a PDSCH after receiving DCI (i.e., DCI to PDSCH time) is less than a specific threshold value reported by UE to a base station as its capability, a TCI state for a PDSCH may be determined as a default TCI state (or a default beam) regardless of whether a TCI field is included in DCI. For example, a default TCI state (or a default beam) may be determined as a TCI state of a CORESET that the lowest CORESET ID (or SS set ID) in the latest slot that a search space is configured is configured.

For example, when the same DCI/PDCCH is repetitively transmitted, a terminal may individually try DCI decoding at a plurality of PDCCH TOs. For example, for a multi-chance method, if the same DCI/PDCCH is transmitted 2 times by using TCI state 1 in slot 1 and by using TCI state 2 in slot 2, UE may experience one of the following three cases.

Case 1: Succeed in DCI decoding in slot 1 (e.g., a first symbol of slot 1), fail in DCI decoding in slot 2 (e.g., a first symbol of slot 2)

Case 2. Fail in DCI decoding in slot 1 (e.g., a first symbol of slot 1), succeed in DCI decoding in slot 2 (e.g., a first symbol of slot 2)

Case 3. Succeed in DCI decoding in slot 1 (e.g., a first symbol of slot 1), succeed in DCI decoding in slot 2 (e.g., a first symbol of slot 2)

As the repetitively transmitted DCI/PDCCH schedules the same PDSCH, DCI to PDSCH time (i.e., time from a last received symbol of DCI to a first symbol of a PDSCH) may be different in each of the above-described Case 1, 2, 3 when the same DCI/PDCCH is transmitted by TDM at a different time.

If a first symbol of a PDSCH is a first symbol of slot 3, UE may determine DCI to PDSCH time as 28 symbols and 14 symbols respectively in Case 1 and 2. As both a case in which DCI to PDSCH time is 14 symbols and a case in which DCI to PDSCH time is 28 symbols exist in Case 3, which value of them should be selected and compared with a predetermined threshold value (e.g., timeDurationForQCL) is unclear.

For example, if it is assumed that a predetermined threshold value used to determine a default TCI state is 20 symbols, DCI to PDSCH time for PDCCH TO 1 (e.g., 28 symbols) is greater than the predetermined threshold value, but DCI to PDSCH time for PDCCH TO 2 (e.g., 14 symbols) is smaller than the predetermined threshold value. In this case, UE receives a PDSCH by using a different TCI state, not a default TCI state (e.g., based on a TCI field included in DCI or based on a CORESET TCI associated with a PDCCH) in Case 1, but UE receives a PDSCH by using a default TCI state in Case 2. In Case 3, UE may not clearly determine whether to use a default TCI state or a different TCI state for PDSCH reception.

Because a base station may not know that UE is in which situation of Case 1, 2, 3, which TCI state should be selected by a base station to be applied to PDSCH transmission is unclear.

In other words, for DCI/PDCCH scheduling one same PDSCH but received at a different time, there is a problem that which TCI state (or beam) will be applied to the one same PDSCH is unclear.

Embodiment 3-2-1

According to this embodiment, when a terminal succeeds in receiving/decoding even one DCI among a set of PDCCH TOs configured or indicated by a base station, it may determine whether to apply a default TCI state (or a default beam) by comparing DCI to PDSCH time with a predetermined threshold value based on a specific PDCCH TO configured or indicated by a base station.

For example, in a multi-chance method, when a base station configures or indicates to UE a set of PDCCH TOs that the same DCI is repetitively transmitted and UE succeeds in receiving even one DCI in a corresponding set, whether to apply a default beam (a default TCI state) may be determined by calculating DCI to PDSCH time and comparing it with a threshold value based on a specific PDCCH TO in the set.

For example, if a PDCCH TO is TDM-ed in a window as in FIG. 8 or FIG. 11, PDCCH TOs in a window may form one set. In other words, as a base station configures a window to UE, UE may receive a configuration or an indication for a set of PDCCH TOs. In this case, time between DCI which should be always received at a specific PDCCH TO regardless of which PDCCH TO in a window receives DCI and a PDSCH scheduled by that DCI may be calculated and compared with a threshold value to determine whether to apply a default beam (or a default TCI state).

Here, a specific PDCCH TO which is a basis of DCI to PDSCH time calculation may be a last PDCCH TO in a set (e.g., a TO which is transmitted last in time order).

In this case, DCI to PDSCH time calculated based on last DCI/PDCCH in time order is 14 symbols in all of the above-described Case 1, 2, 3 and it is smaller than 20 symbols, a predetermined threshold value, so a terminal may clearly determine that a default TCI state (or a default beam) will be applied to all of Case, 1, 2, 3. In addition, although a base station may not know which Case of Case 1, 2, 3 will occur, it may apply and transmit a default TCI state (or a default beam) to a PDSCH based on DCI/PDCCH timing transmitted last.

Embodiment 3-2-2

When the same DCI/PDCCH is repetitively transmitted, a base station may configure each difference between timing of a PDSCH scheduled by corresponding DCI and timing of DCI/PDCCH to be smaller (or greater) than a threshold value. Accordingly, regardless of whether a terminal succeeds in receiving/decoding something of a plurality of DCI/PDCCHs, it may calculate DCI to PDSCH time based on timing of corresponding DCI/PDCCH and compare it with a predetermined threshold value to clearly determine whether to apply a default beam.

For example, when MTRPs repetitively transmit the same PDCCH by TDM, it is possible to calculate a threshold value (e.g., a second threshold value) adjusted by adding a predetermined value (e.g., alpha) to a threshold value reported by UE (e.g., a first threshold value) and ensure that DCI to PDSCH time for a plurality of PDCCH TOs is smaller (or greater) than a second threshold value. Such a second threshold value may be also derived by UE in the same way as a base station. Here, a value of alpha may be a value predetermined based on a SCS or a value indicated by a base station to UE. In addition, a value of alpha may be a positive number or a negative number.

For example, if it is assumed that UE reports to a base station that a first threshold value is 20 symbols and a value of alpha is 20 symbols, a base station and UE may determine that a second threshold value is 40 (=20+20) symbols. Accordingly, both 28 symbols and 14 symbols, DCI to PDSCH time for each of PDCCH TO 1 and 2, are smaller than a second threshold value, so UE and a base station may apply a default beam without distinguishing Case 1, 2, 3.

If a threshold value is not adjusted, a base station may schedule a PDSCH for all PDCCH TOs which repetitively transmit the same DCI so that every DCI to PDSCH time will be smaller or greater than a threshold value (i.e., a first threshold value). If a PDSCH is scheduled to be greater than a threshold value for all of a plurality of PDCCH TOs, a problem may occur that average DCI to PDSCH time increases to increase latency. If a PDSCH is scheduled to be smaller than a threshold value for all of a plurality of PDCCH TOs, there is a problem that scheduling flexibility is lowered because all PDCCH TOs should be scheduled within a threshold value.

Accordingly, by restrictively applying the adjustment of a threshold value only for whether to apply a default beam (or a default TCI state), it is possible to guarantee PDSCH scheduling flexibility, prevent latency from being lengthened and solve a problem of ambiguity about whether to apply a default beam to a PDSCH.

Embodiment 3-2-2

When the same DCI/PDCCH is repetitively transmitted, it may be defined to transmit or receive a PDSCH by applying a default TCI state (or a default beam) all the time.

For example, when MTRPs repetitively transmit the same PDCCH by TDM, regardless of a comparison result between DCI to PDSCH time and/or a predetermined threshold value, a base station may always transmit a PDSCH by using a default beam and UE may always receive a PDSCH by using a default beam. For it, a base station may directly or indirectly indicate to UE that the same DCI/PDCCH is repetitively transmitted (e.g., a window configuration, etc.). Accordingly, UE may always receive a PDSCH by using a default beam in all of the above-described Case 1, 2, 3, so ambiguity may be removed.

Embodiment 3-2-4

When the same DCI/PDCCH is repetitively transmitted, one PDSCH transmission timing scheduled by corresponding DCI (i.e., PDSCH time scheduling) may be configured to be smaller (or greater) than a predetermined threshold value for all PDCCH TOs.

For example, when MTRPs repetitively transmit the same PDCCH by TDM, a base station may schedule every DCI to PDSCH time to be smaller or greater than a predetermined threshold value for all PDCCH Tos transmitting the same DCI. In other words, for a PDCCH TO transmitting the same DCI, UE may not expect a case in which DCI to PDSCH time of some TOs is greater than a threshold value and DCI to PDSCH time of other TOs is smaller than or equal to a threshold value.

Embodiment 3-2-5

When the same DCI/PDCCH is repetitively transmitted, a default TCI state (or a default beam) may not be applied when for even one PDCCH TO of them, DCI to PDSCH time is greater than a predetermined threshold value and a PDSCH (and a PDSCH DMRS) may be received according to a TCI state indicated by a TCI field included in DCI when a TCI field is included in DCI.

At a PDSCH reception occasion, decoding of UE for DCI/PDCCH that DCI to PDSCH time is configured to be greater than a threshold value may be deemed completed. In other words, processing time is enough for DCI received at a PDCCH TO greater than a predetermined threshold value, so if corresponding DCI is successfully decoded and a TCI field is included in corresponding DCI, UE may perform PDSCH reception by using it. Accordingly, without applying a default beam, a TCI state indicated by DCI may be applied.

For the above-described Case 1 and 2, there is no discrepancy between a base station and a terminal in an operation of applying a TCI included in DCI of PDCCH TO 1 to a PDSCH. Meanwhile, for Case 2, a base station may apply a TCI state of a TCI field included in DCI to PDSCH transmission based on PDCCH TO 1, but UE may try PDSCH reception by applying a default TCI state based on PDCCH TO 2 due to failure in DCI/PDCCH blind decoding at PDCCH TO 1. In this case, due to discrepancy between a base station and UE for a TCI applied to a PDSCH, UE may fail in PDSCH reception/decoding and an additional operation such as PDSCH retransmission, etc. may occur, but such a case is assumed as an exception, and complexity of UE implementation may be reduced by removing ambiguity of a UE operation for whether to apply a default beam.

Examples below the above-described embodiment 3-2 may be applied to a case in which MTRPs partitively transmit the same DCI/PDCCH and may be also applied to a case in which MTRPs repetitively transmit the same DCI/PDCCH and UE performs a soft combining method. In other words, when a problem occurs that whether a predetermined threshold value is satisfied for a plurality of PDCCH TOs (or a result of size comparison with a predetermined threshold value) is different because DCI/PDCCH transmission from MTRPs or a STRP is performed at a different occasion (a PDCCH TO), examples below embodiment 3-2 may be applied.

Embodiment 3-3

According to current standards, a CORESET pool may be configured for eMBB MTRP PDSCH transmission. For example, CORESET 0,1,2,3 are configured, CORESET 0,1 are configured as pool 0 and the rest is configured as pool 2, so UE recognizes that a different TRP uses a CORESET existing in a different pool. For a PDSCH scheduled through a CORESET of CORESET pool 0 and a PDSCH scheduled through a CORESET of CORESET pool 1, frequency/time resources may be partially or entirely overlapped, and these two PDSCHs have different data/TB (i.e., a different PDSCH), so resource efficiency may increase to accomplish higher throughput. For example, the CORESET pool may correspond to a CORESET group.

On the other hand, for a URLLC MTRP PDCCH, the same DCI may be transmitted through multiple CORESETs and in this case, a PDSCH scheduled through multiple CORESETs is one PDSCH having one data. It is because DCI is repetitively transmitted to improve a PDCCH reception success rate, but finally, there is one data scheduled by that DCI. In a multi-chance method, UE may independently recognize/decode DCI transmitted through each CORESET without recognizing a PDCCH TO set or a window that the same DCI is repetitively transmitted. In this case, if an eMBB MTRP PDSCH is configured together, a complicated problem occurs. When frequency/time resources of PDSCHs scheduled through multiple CORESETs are entirely overlapped, whether corresponding PDSCHs are a different PDSCH transmitting different data/TB or one PDSCH having one data is ambiguous.

Embodiment 3-3-1

When corresponding CORESETs are configured as a different CORESET group (when corresponding CORESETs are configured as a different CORESET pool), UE recognizes a corresponding PDSCH as multiple (independent) different PDSCHs if frequency/time resources of PDSCHs scheduled through that CORESET are entirely/partially overlapped. In other words, independent data may be received by independently decoding each PDSCH. When corresponding CORESETs are configured as the same CORESET group (when corresponding CORESETS are configured as the same CORESET pool), UE recognizes a corresponding PDSCH as one same PDSCH if frequency/time resources of PDSCHs scheduled through that CORESET are entirely/partially overlapped. In other words, received DCI may be recognized as the same DCI scheduling the same PDSCH and the rest of DCI excluding one DCI may be ignored or discarded.

Although multiple DCI transmitted through multiple CORESETs schedule one PDSCH, frequency/time resources of PDSCHs scheduled by each DCI may not be entirely overlapped and may be only partially overlapped in some cases. For example, when DCI 1 is transmitted through CORESET 1 in slot 1, DCI 2 (scheduling the same data and data scheduled by DCI 1) is transmitted through CORESET 2 in slot 10 and the same scheduled PDSCH is repetitively transmitted in slot 9 and 11, DCI 1 schedules that the same PDSCH is repetitively transmitted in slot 9 and 11 because it is received before a PDSCH is transmitted and DCI 2 schedules that it is repeated one time in slot 11 because it is received while a PDSCH is repetitively transmitted. UE recognizes DCI 1 with more scheduling information of DCI 1 and 2 as final DCI and discards DCI 2. Such an operation is described as follows in LTE Rel-15.

For a serving cell, if the UE is configured with higher layer parameter blindSubframePDSCH-Repetitions, the UE shall discard any PDCCH/EPDCCH for PDSCH data transmissions in subframes in which the UE is receiving PDSCH assigned by PDCCH/EPDCCH with DCI format 1A with CRC scrambled by C-RNTI in UE-specific search space. (for subframe-TTI level PDSCH repetition)

For a serving cell, if the UE is configured with higher layer parameter blindSlotSubslotPDSCH-Repetitions, the UE shall discard any PDCCH/SPDCCH for PDSCH data transmissions in slots/subslots in which the UE is receiving PDSCH assigned by PDCCH/SPDCCH with DCI format 7-1A/7-1B/7-1C/7-1D/7-1E/7-1F/7-1G with CRC scrambled by C-RNTI. (for short-TTI level PDSCH repetition))

Even when multiple DCI schedule one PDSCH, but resources of a PDSCH scheduled by each DCI are only partially overlapped, whether each PDSCH will be recognized as one same PDSCH or will be recognized as a different independent PDSCH may be determined according to whether a CORESET group (pool) is the same or different and when it is recognized as the same PDSCH, UE may recognize DCI with more scheduling information (e.g., DCI 1) as final DCI and discard other DCI.

Embodiment 3-3-2

When multiple DCI indicates the same DMRS CDM group/port, it may be recognized as the same PDSCH and when indicating a different same DMRS CDM group/port, it may be recognized as a different independent PDSCH. Alternatively, when a value of a MCS/a HARQ process number/a RV/a NDI, etc. is the same, it may be recognized as the same PDSCH and when it is different, it may be recognized as a different PDSCH.

Embodiment 3-3-2

Whether a PDSCH scheduled by DCI is one independent PDSCH or repetitively schedules the same PDSCH with other DCI may be indicated by configuring a specific field in DCI (e.g., a 1 bit field). Alternatively, with extension to a N bit field, whether a PDSCH scheduled by DCI is one independent PDSCH or repetitively schedules the same PDSCH with other DCI and the total number of DCI which is repetitively scheduled in this case may be informed to UE.

As an additional example, configuration information on linkage on repeat transmission of the same DCI/PDCCH may be provided for a terminal. For example, a base station may configure or indicate to UE a set of PDCCH TOs that the same DCI is repetitively transmitted. For example, a set of PDCCH TOs may be configured by higher layer (e.g., RRC) signaling to UE and based on it, UE may know in advance the number of TOs in a TO set and the order of each TO.

Embodiment 3-4

In embodiment 3-2, for repeat transmission of the same DCI/PDCCH, various examples solving ambiguity about a possibility of a case in which time between DCI/PDCCH and one PDSCH scheduled by it (e.g., DCI to PDSCH time) is different are described.

Similarly, also for various operations defined based on time with DCI/PDCCH timing (or a PDCCH TO) (PDSCH reception, PUSCH transmission, AP CSI Reporting, AP CSI-RS reception, BWP switching, etc.), corresponding time may be different due to the same DCI/PDCCH repeat transmission. In this case, ambiguity about which DCI/PDCCH timing is a basis for operation may occur.

For example, for DCI to PDSCH time, one DCI may schedule one PDSCH. When time given from DCI to a PDSCH transmission/reception occasion is smaller than a predetermined threshold value, UE may receive a PDSCH by using a default beam. For it, UE may report the predetermined threshold value as a UE capability value to a base station.

For DCI to PUSCH time, one DCI may schedule one PUSCH. When time given from DCI to a PDSCH transmission/reception occasion is smaller than a specific value (e.g., $N_2$), UE may not transmit a PUSCH. To prevent it, a base station may schedule time given from a DCI reception occasion to a PUSCH transmission occasion as a specific value $N_2$ or over. To determine the above specific value $N_2$, UE may report a value of $N_2'$ to a base station, a value of d may be determined according to a PUSCH DMRS pattern and it may be calculated with $N_2=N_2'+d$.

UE PUSCH preparation procedure time related thereto may be defined as follows.

If the first uplink symbol in the PUSCH allocation for a transport block, including the DM-RS, as defined by the slot offset $K_2$ and the start and length indicator SLIV of the scheduling DCI and including the effect of the timing advance, is no earlier than at symbol $L_2$, where $L_2$ is defined as the next uplink symbol with its CP starting $T_{proc,2}=\max((N_2+d_{2,1})(2048+144) \cdot \kappa \cdot 2^{-\mu} \cdot T_c, d_{2,2})$ after the end of the reception of the last symbol of the PDCCH carrying the DCI scheduling the PUSCH, then the UE shall transmit the transport block.

$N_2$ is based on $\mu$ of Table 6.4-1 and Table 6.4-2 for UE processing capability 1 and 2 respectively, where $\mu$ corresponds to the one of ($\mu_{DL}$, $\mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and $\kappa$ is defined as a predetermined constant value.

If the first symbol of the PUSCH allocation consists of DM-RS only, then $d_{2,1}=0$, otherwise $d_{2,1}=1$.

If the UE is configured with multiple active component carriers, the first uplink symbol in the PUSCH allocation further includes the effect of timing difference between component carriers.

If the scheduling DCI triggered a switch of BWP, $d_{2,2}$ equals to the switching time, otherwise $d_{2,2}=0$.

For a UE that supports capability 2 on a given cell, the processing time according to UE processing capability 2 is applied if the high layer parameter processingType2Enabled in PUSCH-ServingCellConfig is configured for the cell and set to enable, If the PUSCH indicated by the DCI is overlapping with one or more PUCCH channels, then the transport block is multiplexed, otherwise the transport block is transmitted on the PUSCH indicated by the DCI.

Otherwise the UE may ignore the scheduling DCI.

The value of $T_{proc,2}$ is used both in the case of normal and extended cyclic prefix.

TABLE 6

| $\mu$ | PUSCH preparation time $N_2$ [symbol] |
| --- | --- |
| 0 | 10 |
| 1 | 12 |
| 2 | 23 |
| 3 | 36 |

TABLE 7

| $\mu$ | PUSCH preparation time $N_2$ [symbol] |
| --- | --- |
| 0 | 5 |
| 1 | 5.5 |
| 2 | 11 for frequency range 1 |

For DCI to AP (aperiodic) CSI report time, one DCI may trigger AP CSI/beam reporting. When time given from DCI to AP CSI/beam reporting is smaller than a specific value Z, UE may ignore corresponding DCI or may not report CSI or may report CSI which is not updated (or calculated).

For DCI to AP CSI-RS time, one DCI may trigger AP CSI/beam reporting and configure an AP CSI-RS as a channel/interference measurement resource for it. When time given from DCI to AP CSI-RS reception is smaller than a specific value, UE does not perform measurement by using a QCL RS (type D) of an AP CSI-RS and performs measurement by using a default beam. Here, the specific value may be determined as the minimum value of 48 and a value reported by UE to a base station as UE capability.

For DCI to BWP switching time, through a BWP indicator field of one DCI (e.g., DCI format 1-1 or 0-1), a scheduled PDSCH/PUSCH and a BWP which will be used for PDCCH/PUCCH/PDSCH/PUSCH transmission and reception may be dynamically changed. When a BWP is changed through a BWP indicator field, time given from a reception occasion of DCI transmitting a corresponding BWP indicator field to a reception occasion of a PDSCH/a PUSCH scheduled by corresponding DCI should be greater than a specific value. A specific value may be reported by UE to a base station as a value of UE capability. In addition, UE may not transmit and receive all PDCCHs/PDSCHs/PUCCHs/PUSCHs from an occasion after reception of DCI including that BWP indicator until a reception occasion of a PDSCH/a PUSCH scheduled by corresponding DCI.

For the above operation such as PDSCH reception, PUSCH transmission, AP CSI reporting, AP CSI-RS reception, BWP switching, etc., a DCI reception occasion may be one reference.

If the same DCI/PDCCH is transmitted at a different time, there are multiple reception occasions of the same DCI. For example, if TRP 1 transmits the same DCI in slot 1 and TRP 2 transmits it in slot 2, for UE, a reception occasion of corresponding DCI becomes slot 1 and slot 2. Accordingly, there is an unclear problem about which DCI is based to determine time given from DCI to a PDSCH reception/PUSCH transmission occasion, time given from DCI to a AP CSI/beam report transmission occasion, time given from DCI to a AP CSI-RS reception occasion, or time given from a reception occasion of DCI transmitting a BWP indicator to a reception occasion of a PDSCH/a PUSCH scheduled by corresponding DCI.

Embodiment 3-4-1

When the same DCI/PDCCH is transmitted from MTRPs or a STRP at a different time, a base station may indicate a specific DCI/PDCCH as a reference PDCCH to UE and a base station and UE may predetermine and pre-share that a reference PDCCH will be applied as a DCI reception occasion. Alternatively, a reference PDCCH may be determined without signaling between a base station and UE based on a predefined rule. For example, a reference PDCCH may be defined as a PDCCH which is transmitted last (or most recently) among a plurality of same PDCCHs which are TDM-ed and transmitted.

For example, information indicating repeat transmission order may be included in DCI. A base station may configure DCI corresponding to last transmission as reference DCI or may configure a i ($1<=i<=N$)-th DCI as a reference DCI. Here, the number of DCI/PDCCH repeat transmissions (N) may be indicated by a base station to UE through higher layer signaling.

In addition, for PDCCHs which are repetitively transmitted (or partitively transmitted), a scrambling sequence may be applied differently to each PDCCH. Accordingly, a PDCCH to which a specific scrambling sequence is applied may be defined as a reference PDCCH.

In addition, for PDCCHs which are repetitively transmitted (or partitively transmitted), a CRC-masked RNTI may be applied differently to each PDCCH. Accordingly, a PDCCH which is CRC-masked with a specific RNTI may be defined as a reference PDCCH.

A reference PDCCH determined as such may be used to determine a DCI reception occasion during the same DCI/PDCCH repeat transmission. For example, a DCI reception occasion for DCI to PDSCH time, DCI to PUSCH time, DCI to AP CSI report time, DCI to AP CSI-RS time, DCI to BWP switching time may be determined based on a reference PDCCH and also for other operations, one of a plurality of DCI reception occasions may be determined by using a reference PDCCH.

Embodiment 3-5

For repeat transmission of the same DCI/PDCCH, a plurality of default TCI states (default beams) may be determined based on DCI to PDSCH time. When one PDSCH from a single TRP (STRP) is scheduled by the repetitively transmitted same DCI, which of a plurality of default beams will be applied to a PDSCH becomes unclear.

For example, as in an example of FIG. 18, when the same DCI/PDCCH is repetitively transmitted by TDM, TRP 1 may transmit a PDCCH (e.g., DCI 1) through a CORESET (e.g., CORESET 0) belonging to CORESET pool 0 and TRP 2 may transmit a PDCCH (e.g., DCI 2) through a CORESET (e.g., CORESET 1) belonging to CORESET pool 1.

In an example of FIG. 18, when for both DCI 1 and DCI 2, DCI to PDSCH time is smaller than a specific threshold value reported by UE as a capability, if UE has a capability to receive 2 default beams at the same time, UE may find default beam 1 among 2 CORESETs belonging to CORESET pool 1 and find default beam 2 among 2 CORESETs belonging to CORESET pool 2.

Whether a PDSCH is transmitted from a STRP or from MTRPs may be indicated by a base station or may be understood by UE as follows. For example, it may be determined that when there are two or more TCI states of a PDSCH indicated by DCI, it is MTRP transmission and otherwise, it is STRP transmission. Alternatively, although there is one TCI state of a PDSCH indicated by DCI, it may be determined as MTRP transmission when a TCI state value indicated by DCI 1 and DCI 2 is different. Alternatively, when a DMRS port indicated by DCI 1 and DCI 2 is defined through a different CDM group, it may be determined as MTRP transmission and when defined through the same CDM group, it may be determined as STRP transmission.

If a PDSCH is transmitted from MTRPs in an example of FIG. 18, both default beams are valid.

If a PDSCH is transmitted from a STRP in an example of FIG. 18, only any one of default beam 1 and 2 may be valid for a STRP PDSCH. In this case, UE should determine which of two default beams is a valid default beam. In FIG. 18, an example in which UE receives a PDSCH is shown, but the same problem may occur even when receiving a AP CSIRS instead of a PDSCH. In other words, when DCI to AP CISRS time is smaller than a specific threshold value based on capability reporting of UE, the same problem occurs and it may be solved in the same way through a proposal of the following embodiment.

Embodiment 3-5-1

A base station may indicate to UE what is a valid default beam used for STRP PDSCH reception among a plurality of default beams.

For example, a base station may indicate to UE one of default beam 1 and default beam 2 through a TCI field of DCI and alternatively, it may indicate a valid default beam through higher layer control information such as RRC and/or MAC CE, etc.

Alternatively, when UE may receive multiple default beams, a plurality of reception operation modes operating by using at least one of multiple default beams may be defined and a base station may enable one of the plurality of reception operation modes and indicate it to UE. For example, a base station may enable one of a mode which performs channel (i.e., data channel and/or control channel) reception by using multiple default beams, a mode which performs channel reception by using one default beam, a mode which receives a channel by using default beam 1 and a mode which receives a channel by using default beam 2 for UE to make UE operate in an enabled mode.

Embodiment 3-5-2

A base station may predefine or preconfigure to UE one specific default beam among a plurality of default beams as a valid default beam which will be used for STRP PDSCH reception.

For example, when the same DCI/PDCCH is repetitively transmitted by TDM, it may be predetermined and pre-shared that a default beam corresponding to a CORESET pool of a last (i.e., recently) received/transmitted PDCCH (e.g., DCI 2) is configured as a valid default beam.

Alternatively, simply, one of default beam 1 or default beam 2 may be predetermined as a valid default beam. For example, a valid default beam may be determined as default beam 1 which is a default beam configured based on CORESETs with a small CORESET pool index or may be determined as default beam 2 which is a default beam configured based on CORESETs with a large CORESET pool index.

Embodiment 3-5-3

Whether a PDSCH scheduled by repeat transmission of the same DCI/PDCCH is a STRP PDSCH or a MTRP PDSCH may be configured to UE in a semi-static way. For example, a base station may indicate a STRP PDSCH or a MTRP PDSCH to UE through higher layer signaling, etc.

For example, when a STRP PDSCH is scheduled by DCI 1 and DCI 2, one default beam determined without dividing a CORESET pool index with which DCI 1 and DCI 2 are associated may be determined as a valid default beam.

Embodiment 3-5-4

Whether a PDSCH scheduled by repeat transmission of the same DCI/PDCCH is a STRP PDSCH or a MTRP PDSCH may be configured to UE in a semi-static way (e.g., through higher layer signaling).

For example, when the same DCI/PDCCH is repetitively transmitted by TDM, a PDSCH may be received by using a default beam corresponding to a CORESET pool of a last (i.e., recently) received/transmitted PDCCH (e.g., DCI 2). Unlike Embodiment 3-5-2, without preconfiguring/predefining a valid default beam between a base station and UE, UE may receive a PDSCH by using a default beam associated with a CORESET associated with a last received DCI/PDCCH.

Alternatively, simply, one of default beam 1 or default beam 2 may be predetermined as a valid default beam.

Alternatively, a base station may indicate to UE a default beam used for STRP PDSCH transmission.

Embodiment 3-6

As in the above-described embodiment 3-2, 3-4 and 3-5, when the same DCI is TDM-ed and repetitively transmitted to multiple PDCCHs (or partitively transmitted to multiple PDCCHs), an ambiguous problem occurs for a default beam determination of DCI.

To solve it, a base station and UE may predetermine and pre-share that only a specific PDCCH of TDM-ed PDCCHs is used for a default beam determination and other PDCCHs do not affect a default beam determination.

A specific PDCCH may be indicated by a base station to UE or may be predetermined as a last (or recently) received/transmitted PDCCH or may be predetermined as a first received/transmitted PDCCH. For example, if two TRPs repetitively transmit the same DCI to slot 1 and slot 2 and uses only a PDCCH transmitted to slot 2 for a default beam determination, UE may determine a default beam by assuming that a PDCCH of slot 1 does not exist and only a PDCCH of slot 2 exists.

Embodiment 3-7

When the same DCI/PDCCH is repetitively transmitted, UE may increase a reception success rate by performing soft combining for PDCCHs. Whether such soft combining is performed may be reported in advance by UE to a base station as capability information and a base station may configure a different redundancy version to each PDCCH and inform it to UE in order to improve soft combining performance.

As UE receives a plurality of DCI/PDCCHs and performs soft combining for corresponding PDCCHs, computational complexity gets higher than when decoding a single PDCCH. Consequently, PDCCH decoding time may increase and in this case, parameters determined based on PDCCH decoding time may be influenced. Such parameters, for example, may be timeDurationForQCL associated with DCI to PDSCH time, Z related to DCI to AP CSI report time, $N_2$ related to DCI to PUSCH time, etc.

Embodiment 3-7-1

UE (e.g., UE operating in frequency range 2) stores a DL signal by using a default beam during timeDurationForQCL time after receiving a PDCCH with DL control information (e.g., DCI format 1-0, 1-1, 1-2) and timeDurationForQCL is designed by considering PDCCH decoding time.

When PDCCH decoding time increases due to DCI/PDCCH repeat transmission, but a value of timeDurationForQCL remains unchanged, UE should perform more operations for PDCCH decoding during the same time, so a burden on UE implementation grows. Accordingly, when soft combining is performed for multiple PDCCHs, timeDurationForQCL may be increased. For example, a value of timeDurationForQCL reported by UE to a base station may be determined as follows and this value may be increased.

The above-described timeDurationForQCL may be defined as the minimum number of OFDM symbols required by the UE to perform PDCCH reception and applying spatial QCL information received in DCI for PDSCH processing.

In addition, timeDurationForQCL may be related to UE capability and UE may transmit a specific value to a base station through capability reporting. The specific value, for example, may be 7, 14 or 28 symbols for SCS 60 kHz or 14 or 28 symbols for SCS 120 kHz.

For example, separately from the existing timeDurationForQCL parameter, UE may additionally report a new parameter considering soft combining (e.g., timeDurationForQCL2) to a base station. Accordingly, when UE applies soft combining to multiple PDCCHs, a default beam may be determined based on a timeDurationForQCL2 parameter.

As an additional example, when applying soft combining to multiple PDCCHs, UE may update a value of timeDurationForQCL by adding time by alpha (e.g., 1 or 2 symbols) to the existing timeDurationForQCL and determine a default beam based on updated timeDurationForQCL. For example, the alpha value may be predefined or may be configured by a base station to UE or an alpha value applied by UE may be reported to a base station.

Increment (e.g., alpha) for a value of timeDurationForQCL as described above may vary depending on the number of PDCCHs performing soft combining (i.e., the number of PDCCHs which are repetitively transmitted or partitively transmitted). For example, as the number of PDCCHs performing soft combining increases, the amount of calculation increases, so larger increment may be applied. For example, for soft combining for 2 PDCCHs, a value of increment may be configured as 1 symbol and for soft combining for 4 PDCCHs, a value of increment may be configured as 2 symbols.

In addition, the increment may be configured differently according to a SCS. For example, as SCS is higher, an increment size may increase.

For example, based on at least one of the number of repetitively transmitted PDCCHs or a SCS, a value of timeDurationForQCL (or a new parameter, or increment) may be determined or configured.

As an additional example, when scheduling information for an AP CSI-RS is included in DCI/PDCCH, similar to a case of PDSCH reception, UE may store a DL signal through a default beam during certain time after receiving DCI/PDCCH. In other words, after PDCCH reception, during beamSwitchTiming time reported by UE, UE may receive a DL signal by applying a default beam. When multiple PDCCHs are processed by soft combining, beamSwitchTiming may be increased.

Such beamSwitchTiming may be defined as the minimum number of OFDM symbols between the DCI triggering of aperiodic CSI-RS and aperiodic CSI-RS transmission. Such beamSwitchingTiming may be delivered to a base station through UE capability reporting. In addition, a value of corresponding beamSwitchTiming may be preconfigured per SCS supported by UE.

In addition, for beamSwitchTiming, based on at least one of the number of repetitively transmitted PDCCHs or a SCS, a value of beamSwitchTiming (or a new parameter, or increment) may be determined or configured.

Embodiment 3-7-2

UE (e.g., UE operating in frequency range 2) may expect a PUSCH to be scheduled after specific time (e.g., PUSCH preparation time $N_2$) after receiving a PDCCH with UL control information (e.g., DCI format 0-0, 0-1, 0-2).

For DCI/PDCCH scheduling a PUSCH before PUSCH preparation time, UE ignores corresponding DCI/PDCCH and does not perform PUSCH transmission. UE may report a value of $N_2'$ to a base station as UE capability and a value of $N_2$ may be determined according to $N_2 = N_2' + d_{2,1}-$. Here, $d_{2,1}-$ may be determined as a value of 0 or 1 or over according to a parameter such as a UL DMRS configuration, etc. For example, a value of $N_2$ may be determined according to UE processing capability and may be related to PUSCH preparation time. In addition, $N_2$ may be configured in a unit of a symbol.

For example, according to a DMRS configuration and a SCS, a value of $N_2'$ may be configured as in Table 8.

TABLE 8

| Configuration | HARQ Timing Parameter | 15 kHz SCS | 30 kHz SCS | 60 kHz SCS | 120 kHz SCS |
|---|---|---|---|---|---|
| Only front-loaded DMRS | $N_1'$ | 8 | 10 | 17 | 20 |
| Front-loaded and Additional DMRS | $N_1'$ | 13 | 13 | 20 | 24 |
| Frequency-first RE Mapping | $N_2'$ | 10 | 12 | 23 | 36 |

A value of $N_2$ is designed by considering PDCCH decoding time, so when performing soft combining for multiple PDCCHs, this value may be increased.

For example, separately from the existing $N_2'$, UE may additionally report $N_2''$, a new parameter considering soft combining, to a base station. When soft combining for multiple PDCCHs is applied, $N_2$ may be determined based on $N_2''$ instead of $N_2'$.

As an additional example, when soft combining is applied, UE may update a value of $N_2'$ by adding time by alpha (e.g., 1 or 2 symbols) to the existing $N_2'$ and $N_2$ may be determined based on updated $N_2'$. For example, an alpha value may be predefined or may be configured by a base station to UE or an alpha value applied by UE may be reported to a base station.

Additionally, increment (e.g., alpha) for a value of $N_2'$ (or $N_2$) may vary depending on the number of PDCCHs performing soft combining (i.e., the number of PDCCHs which are repetitively transmitted or partitively transmitted). As the number of PDCCHs increases, the amount of calculation increases, so larger increment may be applied. For example, for soft combining for 2 PDCCHs, a value of increment may be configured as 1 symbol and for soft combining for 4 PDCCHs, a value of increment may be configured as 2 symbols.

In addition, the increment may be configured differently according to a SCS. For example, as a SCS is higher, an increment size may increase.

For example, based on at least one of the number of repetitively transmitted PDCCHs or a SCS, a value of $N_2$ (or a new parameter, or increment) may be determined or configured.

Embodiment 3-7-3

UE (e.g., UE operating in frequency range 2) may expect a PUSCH for aperiodic CSI reporting to be scheduled after specific time (e.g., Z) after receiving a PDCCH with UL control information (e.g., DCI format 0-0, 0-1, 0-2).

For DCI/PDCCH scheduling a PUSCH before Z time, UE may ignore corresponding DCI/PDCCH and may not perform PUSCH (i.e., AP CSI feedback) transmission or may perform PUSCH transmission which does not include AP CSI feedback or may report CSI which is not updated (or calculated).

UE may report a value of Z to a base station as capability. In an example of the following Table 9 and Table 10, all of $Z_1$, $Z_2$, $Z_3$ are a value related to Z and according to CSI reporting configuration conditions, one of $Z_1$, $Z_2$, $Z_3$ may be determined as Z. An example of Table 9 and Table 10 may be applied to a different CSI calculation delay requirement and represents a value of a symbol unit.

TABLE 9

| μ | $Z_1$ | $Z_1'$ |
|---|---|---|
| 0 | 10 | 8 |
| 1 | 13 | 11 |
| 2 | 25 | 21 |
| 3 | 43 | 36 |

TABLE 10

| μ | $Z_1$ | $Z_1'$ | $Z_2$ | $Z_2'$ | $Z_3$ | $Z_3'$ |
|---|---|---|---|---|---|---|
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3$ + $KB_1$) | $X_3$ |
| 3 | 97 | 85 | 152 | 140 | min(97, $X_4$ + $KB_2$) | $X_4$ |

Z, Z' and μ are defined as follows.

$$Z = \max_{m=0,\ldots,M-1}(Z(m)),$$

$$Z' = \max_{m=0,\ldots,M-1}(Z'(m)),$$

where M is the number of updated CSI report(s), (Z(m),Z'(m)) corresponds to the m-th updated CSI report and is defined as follows.

$(Z_1,Z_1')$ of the table 9 if the CSI is triggered without a PUSCH with either transport block or HARQ-ACK or both when L=0 CPUs are occupied and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or $(Z_1,Z_1')$ of the table 10 if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or $(Z_1,Z_1')$ of the table 10 if the CSI to be transmitted corresponds to wideband frequency-granularity where the reportQuantity is set to 'ssb-Index-SINR', or reportQuantity is set to 'cri-SINR', or $(Z_3,Z_3')$ of table 10 if reportQuantity is set to 'cri-RSRP' or 'ssb-Index-RSRP', wherein is according to UE reported capability beamReportTiming and KB1 is according to UE reported capability beamSwitchTiming, or Otherwise, $(Z_2,Z_2')$ of Table 10.

μ of table 9 and table 10 corresponds to the min ($μ_{PDCCH}$, $μ_{CSI-RS}$, $μ_{UL}$) where the $μ_{PDCCH}$ corresponds to the subcarrier spacing of the PDCCH with which the DCI was transmitted and $μ_{UL}$ corresponds to the subcarrier spacing of the PUSCH with which the CSI report is to be transmitted and $μ_{CSI-RS}$ corresponds to the minimum subcarrier spacing of the aperiodic CSI-RS triggered by the DCI.

A value of Z is designed by considering PDCCH decoding time, so when soft combining for multiple PDCCHs related to DCI/PDCCH repeat transmission is performed, an increased value of Z may be applied.

For example, separately from a parameter Z, UE may additionally report a new parameter Z" (e.g., $Z_{-1}"$, $Z_2"$, $Z_3"$) considering soft combining and apply Z" instead of Z when applying soft combining for multiple PDCCHs related to DCI/PDCCH repeat transmission.

As an additional example, when applying soft combining, UE may update a value of Z by adding time by alpha (e.g., 1 or 2 symbols) to the existing Z and apply updated Z. For example, an alpha value may be predefined or may be configured by a base station to UE or an alpha value applied by UE may be reported to a base station.

Additionally, increment (e.g., alpha) about a value of Z may vary depending on the number of PDCCHs performing soft combining (i.e., the number of PDCCHs which are repetitively transmitted or partitively transmitted). As the number of PDCCHs increases, the amount of calculation increases, so larger increment may be applied. For example, for soft combining for 2 PDCCHs, a value of increment may be configured as 1 symbol and for soft combining for 4 PDCCHs, a value of increment may be configured as 2 symbols.

In addition, the increment may be configured differently according to a SCS. For example, as a SCS is higher, an increment size may increase.

For example, based on at least one of the number of repetitively transmitted PDCCHs or a SCS, a value of Z (or a new parameter, or increment) may be determined or configured.

Embodiment 3-8

When the same DCI/PDCCH repeat transmission is performed in a plurality of component carriers or a plurality of serving cells, ambiguity about a default TCI state (or default beam) determination may occur.

Figure 19:
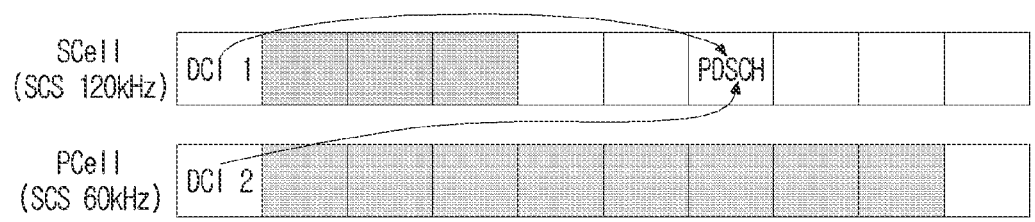
FIG. 19 is a diagram for describing a situation of multiple cells to which the present disclosure may be applied.

FIG. 19 is a diagram for describing a situation of multiple cells to which the present disclosure may be applied.

In an example of FIG. 19, TRP 1 transmits DCI 1 and data based on it (e.g., a PDSCH) with subcarrier spacing 120 kHz in a Scell (secondary cell) and transmits DCI 2 with subcarrier spacing 60 kHz in a Pcell (primary cell). DCI 2 is the same DCI as DCI 1 and includes scheduling information on a PDSCH of TRP 1.

A default beam section (e.g., a section that the above-described DCI to PDSCH time is smaller than a predetermined offset (e.g., timeDurationForQCL)) may be configured differently in a different serving cell. For example, a default beam section for DCI 1 (3 slot sections in a SCell) and a default beam section for DCI 2 (8 slot sections in a PCell) may be configured differently. In this case, a PDSCH exists outside a default beam section based on DCI 1, but it exists inside a default beam section based on DCI 2. Accordingly, when UE receives a PDSCH, whether a default beam will be applied is unclear.

In this case, a solution for a case in which the same DCI (PDCCH TO) in the above-described embodiment 3-2 is repetitively transmitted at a different occasion may be extended and applied to a case in which the same DCI (PDCCH TO) is repetitively transmitted at a different occasion in a plurality of cells. For example, when DCI/PDCCH is repetitively transmitted in a plurality of cells, whether to apply a default TCI may be determined by comparing with a predetermined threshold value based on specific (e.g., last received) DCI (PDCCH TO), or a default TCI may be configured to be applied to all DCI (PDCCH TO) by increasing a predetermined threshold value, or a default TCI may be configured to be applied all the time, or all of a plurality of DCI (PDCCH TO) may be configured to be smaller or greater than a predetermined threshold value, or a TCI for a PDSCH may be determined according to a TCI field included in DCI without applying a default TCI if even one of a plurality of DCI (PDCCH TO) is greater than a predetermined threshold value.

Embodiment 3-8-1

When the same DCI/PDCCH is repetitively transmitted in a plurality of cells, an individual default beam section for each DCI/PDCCH may be determined and a final default beam section corresponding to an union of individual default beam sections may be determined. A final default beam section may be determined as a default beam section which exists to the last (or which ends last, or which ends at the closest occasion to a PDSCH scheduled by DCI) in a time domain among individual default beam sections. In an example of FIG. 19, a default beam section based on DCI 2 may be determined as a final default beam section.

As an additional example, When the same DCI/PDCCH is repetitively transmitted in a plurality of cells, an individual default beam section for each DCI/PDCCH may be determined and a final default beam section corresponding to an intersection of individual default beam sections may be determined. A final default beam section may be determined as a default beam section which exists for the shortest time (or which ends first, or which ends at the farthest occasion from a PDSCH scheduled by DCI) in a time domain among individual default beam sections. In an example of FIG. 19, a default beam section based on DCI 1 may be determined as a final default beam section.

When the same DCI/PDCCH is transmitted in a plurality of cells, the above-described example for whether to apply a default beam related to PDSCH scheduling may be extended and applied to examples of embodiment 3-4 for PUSCH scheduling, CSI reporting, CSI-RS reception and BWP switching. For example, a time section related to DCI/PDCCH in embodiment 3-4 (e.g., DCI to PDSCH time, DCI to PUSCH time, DCI to AP CSI report time, DCI to AP CSI-RS time, DCI to BWP switching time, etc.) may determine the time section based on one specific thing (i.e., a reference PDCCH) of the same DCI/PDCCH which is repetitively transmitted in a plurality of cells. In addition, a time reference compared with a time section related to DCI/PDCCH in embodiment 3-4 (e.g., timeDuration-ForQCL, $N_2$, Z, beamSwitchTiming, etc.) may be determined according to an union or an intersection thereof when a plurality of time reference values exist based on a SCS and/or the number of DCI/PDCCH repeat transmissions, etc. in each of a plurality of cells.

For example, embodiments 3-2 and 3-8 proposed a default beam determination method in a situation that DCI schedules a PDSCH, but they may be also equally applied to a default beam determination method in a situation that DCI schedules an AP CSI-RS. But, unlike a PDSCH default beam based on timeDurationForQCL, an AP CSIRS default beam may be determined based on beamSwitchTiming.

Various examples in the above-described present disclosure mainly describe that the same DCI/PDCCH are transmitted through two TCI states, but it is just for convenience of a description and does not limit a scope of the present disclosure. In other words, examples of the present disclosure are about a method of clearly determining a TCI state which will be applied to a STRP PDSCH scheduled by corresponding DCI even for a case in which the same DCI/PDCCH is associated with 2 or more different TCI states (e.g., a case in which a TCI state (or a default TCI state) associated with a CORESET associated with DCI is different) in one or more serving cells from one or more TRPs.

Figure 20:
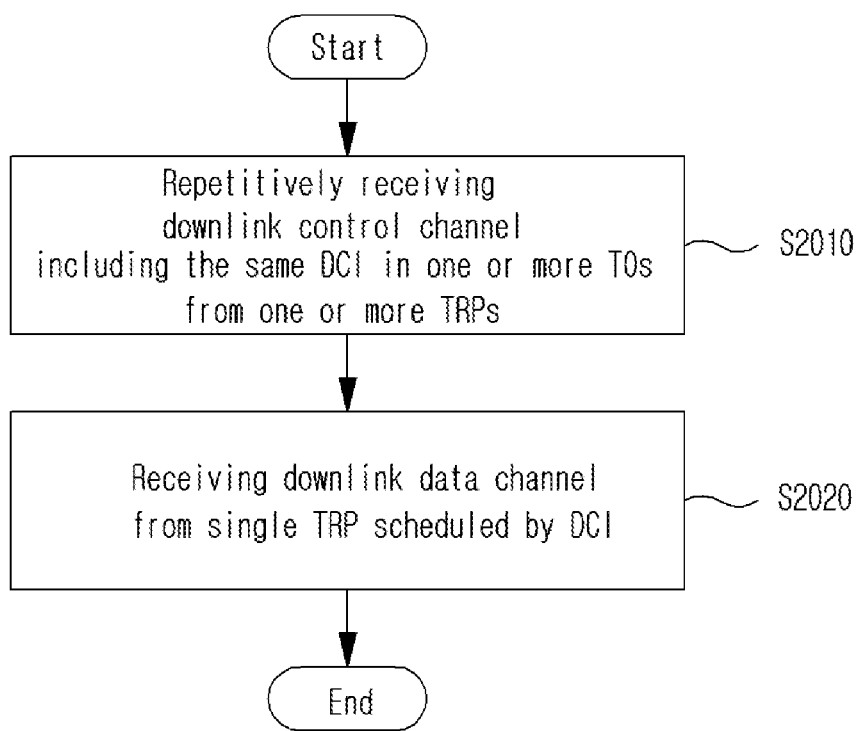
FIG. 20 is a flow chart for describing a method in which a terminal according to the present disclosure receives a PDSCH from a single TRP based on a plurality of PDCCHs.

FIG. 20 is a flow chart for describing a method in which a terminal according to the present disclosure receives a PDSCH from a single TRP based on a plurality of PDCCHs.

In Step S2010, a terminal may repetitively receive a downlink control channel (e.g., a PDCCH) including the same DCI at one or more transmission occasions (TO) from one or more TRPs.

For example, a plurality of PDCCHs including repetitively received DCI may be received in a resource distinct from one or more of time resources or frequency resources.

For example, the same DCI may be repetitively transmitted from a STRP or the same DCI may be repetitively (or partitively) transmitted from MTRPs.

In Step S2020, a terminal may receive a downlink data channel from a single TRP (a STRP).

Here, when a time interval (e.g., DCI to PDSCH time) between a specific TO of one or more TOs and a downlink data channel scheduled by the same DCI (e.g., a PDSCH) is smaller than a predetermined threshold value (e.g., timeDurationForQCL), a terminal may receive a PDSCH based on a default TCI state (e.g., refer to Embodiment 3-2).

Here, a default TCI state may be a TCI state associated with a CORESET (or a SS set) having the lowest identifier in the latest slot monitored by a terminal (refer to a description on a default TCI state in Embodiment 3-1 and 3-2).

In addition, a specific TO may be a last TO in a time domain among the one or more TOs or all of the one or more TOs may be configured to be smaller than or greater than or equal to a predetermined threshold value (refer to detailed examples in Embodiment 3-2).

In addition, when a time interval between the one or more TOs and the downlink data channel reception time is equal to or greater than the predetermined threshold value (i.e., when a default TCI state is not applied), and when a TCI field is not included in the DCI (i.e., when a TCI state associated with a CORESET associated with DCI is applied to PDSCH reception), and when there are a plurality of TCI states associated with a CORESET, the downlink data channel may be received based on one specific preconfigured TCI state among the plurality of TCI states (refer to Embodiment 3-1).

Here, one specific preconfigured TCI state may be determined based on a first TO in a time domain, a TO using a TCI state of the lowest index or a TO corresponding to a CORESET (or a SS set) of the lowest identifier (refer to detailed examples in Embodiment 3-1).

In addition, when all time intervals between a plurality of TOs and downlink data channel reception are smaller than a predetermined threshold value (i.e., when a default TCI state is applied) and when the plurality of TOs belong to a different CORESET pool and accordingly, a plurality of default TCI states are determined, the downlink data channel may be received based on a preconfigured specific default TCI state among a plurality of default TCI states (refer to Embodiment 3-5).

In addition, a last downlink control channel in a time domain may be configured as a reference downlink control channel among the downlink control channels received at a plurality of TOs and based on a reception occasion of the reference downlink control channel, a time interval between one or more of an uplink data channel transmission occasion, an aperiodic channel state information (CSI) reporting occasion, an aperiodic CSI-reference signal (RS) reception occasion, or a bandwidth part (BWP) switching time may be determined (refer to Embodiment 3-4).

In addition, based on a plurality of serving cells configured for the terminal, among time intervals between the one or more TOs and the downlink data channel reception time regarding the plurality of serving cells, the default TCI state may be determined based on a time interval which ends at the latest or earliest occasion (refer to Embodiment 3-8).

In addition, a value for modification of a terminal capability parameter associated with decoding time of a plurality of downlink control channels including the repetitively received same DCI may be transmitted to a network side (refer to Embodiment 3-7).

Figure 21:
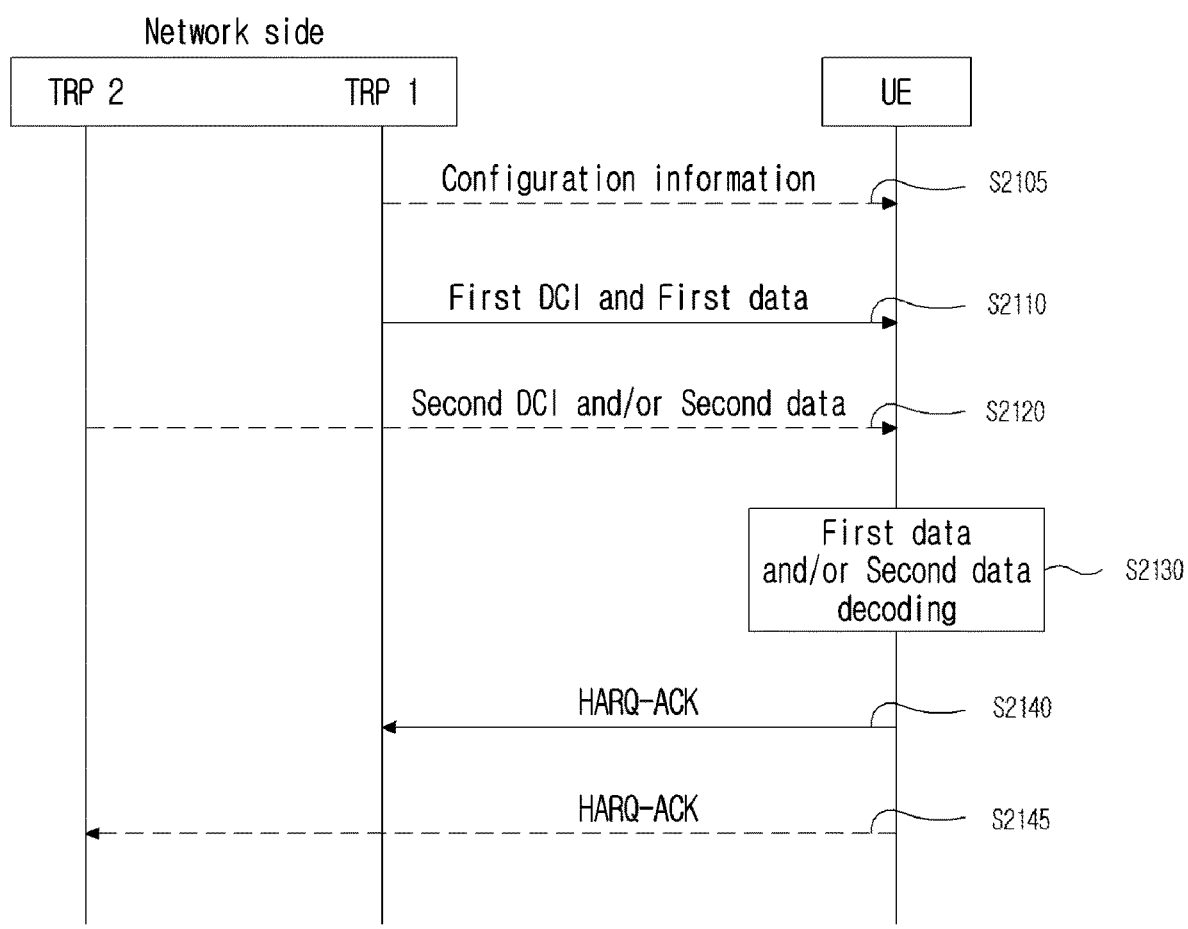
FIG. 21 is a diagram for describing a signaling procedure of a network side and a terminal according to the present disclosure.

FIG. 21 is a diagram for describing a signaling procedure of a network side and a terminal according to the present disclosure.

FIG. 21 represents signaling between a network side (e.g., a first TRP and a second TRP) and a terminal (UE) under a situation of a plurality of TRPs to which various embodiments of the present disclosure (embodiment 1, 2 and/or 3) may be applied (in the following description, a TRP may be replaced with a base station and a cell). Here, an UE/Network side is just an example and may be applied by being replaced with a variety of devices as described in relation to the above-described description or FIG. 22. FIG. 21 is just for convenience of a description, and does not limit a scope of the present disclosure. In addition, some step(s) shown in FIG. 21 may be omitted according to a situation and/or a configuration, etc.

In reference to FIG. 21, signaling between 2 TRPs and UE is considered for convenience of a description, but it goes without saying that a corresponding signaling method may be extended and applied to signaling between multiple TRPs and multiple UE. In the following description, a Network side may be one base station including a plurality of TRPs and may be one cell including a plurality of TRPs. In an example, an ideal/non-ideal backhaul may be configured between a first TRP and a second TRP configuring a network side. In addition, the following description is described based on multiple TRPs, but it may be equally extended and applied to transmission through multiple panels. In addition, in the present disclosure, an operation that a terminal receives a signal from a first TRP and/or a second TRP may include an operation that a terminal receives a signal from a network side (through/with a first TRP and/or a second TRP) and an operation that a terminal transmits a signal to a first TRP and/or a second TRP may include an operation that a terminal transmits a signal to a network side (through/with a first TRP and/or a second TRP).

An example of FIG. 21 represents signaling when a terminal receives multiple DCI under a situation of M-TRPs (or a case in which a plurality of CORESETs are configured from one TRP may be also assumed as M-TRPs) (e.g., when each TRP repetitively transmits the same DCI (or partitively the same DCI) to UE).

Although not shown in FIG. 21, UE may transmit UE capability including capability information related to performance of operations proposed in the above-described embodiment 1, 2 and/or 3 to a network side through/with TRP 1 (and/or TRP 2). For example, as described in embodiment 3-7, etc., the UE capability may include timing-related information considering soft combining (e.g., timeDurationForQCL, Z, $N_2$, etc.). For example, a parameter related to timeDurationForQCL, Z, $N_2$, etc. considering soft combining may be newly defined. Alternatively, a specific parameter (e.g., alpha) added to the existing parameter may be configured/defined and for soft combining, data transmission and reception related timing may be determined by further considering the specific parameter. In other words, based on whether to apply soft combining, a value of timeDurationForQCL, Z, $N_2$, etc. applied when UE transmits and receives data may be different.

UE may receive configuration information on multiple TRP based transmission and reception through/with TRP 1 (and/or TRP 2) from a Network side S2105. The configuration information may include information related to a configuration of a network side (i.e., a TRP configuration), resource information related to multiple TRP based transmission and reception (resource allocation), etc. In this case, the configuration information may be transmitted through higher layer signaling (e.g., RRC signaling, MAC-CE, etc.). In addition, when the configuration information is predefined or preconfigured, a corresponding step may be omitted. For example, the configuration information may include a configuration related to a TCI state mapping method/way described in the above-described embodiment 1, 2, and/or 3 and so on. In addition, for example, the configuration information may include information related to a configuration of a transmission occasion described in embodiment 1, 2, and/or 3, information related to TCI mapping, information related to repeat transmission of a control channel (e.g., a PDCCH) (e.g., whether repeat transmission is performed, the number of times of repeat transmission, etc.), etc. For example, as described in detailed examples of the above-described embodiment 3, the configuration information may include default beam related configuration, reference control channel information associated with a beam and/or a spatial relation RS, etc. by considering repeat/partition transmission of a control channel (e.g., a PDCCH).

For example, an operation that UE in the above-described step S2105 (100/200 in FIG. 22) receives configuration information related to the multiple TRP-based transmission and reception from a network side (100/200 in FIG. 22) may be implemented by a device in FIG. 22 which will be described below. For example, in reference to FIG. 22, one or more processors 102 may control one or more transceivers 106 and/or one or more memories 104, etc. to receive configuration information related to the multiple TRP-based transmission and reception and one or more transceivers 106 may receive configuration information related to the multiple TRP-based transmission and reception from a network side.

UE may receive first DCI and first data scheduled by first DCI through/with TRP 1 from a network side S2110. In addition, UE may receive second DCI and second data scheduled by second DCI through/with TRP 2 from a network side or may receive second data scheduled by first DCI without second DCI or may receive only second DCI scheduling first data S2120. For example, data of a single TRP (e.g., first date of TRP 1, or second data of TRP 2) may be scheduled by first DCI and second DCI repetitively transmitted from TRP 1 and TRP 2.

For example, first DCI (and second DCI) may include (indication) information on a TCI state, resource allocation information on a DMRS and/or data (i.e., a space/frequency/time resource), etc. described in the above-described embodiment 1, 2, and/or 3. For example, first DCI (and second DCI) may include information related to repeat transmission of a control channel (e.g., a PDCCH) (e.g., a specific DCI format/SS/RNTI, etc.), indication information related to configuration of a transmission occasion (TO), information related to mapping between a TO and a TCI state (e.g., mapping order), etc. In this case, first data and second data may be transmitted and received based on a TCI state mapping method described in the above-described embodiment 1, 2, and/or 3. For example, TCI state mapping with a TO of a control channel may be configured based on configuration of a CORESET/a SS set, etc. in a window that DCI is received. For example, a set of TOs of a PDCCH may be configured.

DCI (e.g., first DCI and second DCI) and data (e.g., first data and second data) may be transmitted through a control channel (e.g., a PDCCH, etc.) and a data channel (e.g., a PDSCH, etc.), respectively. For example, the control channel (e.g., a PDCCH) may be repetitively transmitted and the same control channel may be partitively transmitted. In addition, Step S2110 and Step S2120 may be performed simultaneously or any one may be performed earlier than the other.

For example, a default TCI state (a default beam) may be configured to be mapped by comparing time between the DCI (e.g., first DCI and/or second DCI) and data (e.g., first data and/or second data) and a specific threshold value.

For example, as described in detailed examples of the above-described embodiment 3, a beam/a spatial relation RS which will be applied when receiving the data (e.g., first data and/or second data) may be determined by comparing an interval (an offset value) between the DCI (e.g., first DCI and/or second DCI) and data (e.g., first data and/or second data) and a specific value. For example, when the interval (offset value) is smaller than a specific value, a default beam/a spatial relation RS may be applied and when it is greater than a specific value, a beam/a spatial relation RS may be determined based on a TCI state, etc. indicated/configured through the DCI (e.g., first DCI and/or second DCI). For example, when the control channel (e.g., a PDCCH) is repetitively transmitted, a reference PDCCH/DCI may be determined by an indication/configuration of a network side or a predefined rule and the above-described operation may be performed based on the reference PDCCH/DCI. For example, the DCI (e.g., first DCI and/or second DCI) may include PDSCH/PUCCH/PUSCH related scheduling information/AP CSI reporting related information/AP CSIRS related information/BWP related information, etc. For example, whether of M-TRPs/a S-TRP may be configured based on the DCI (e.g., first DCI and/or second DCI). In an example, whether of M-TRPs/a S-TRP may be configured based on the number of TCI states/a TCI state value/DMRS port related configuration, etc. included in the DCI (e.g., first DCI and/or second DCI). For example, the DCI (e.g., first DCI and/or second DCI) may include default beam related information.

For example, as described in embodiment 3-8, when the same DCI is repetitively transmitted in a different TRP, a default beam may be determined based on an union or an intersection of default beam information related to each DCI.

For example, a time/frequency resource that first data and second data are received may be overlapped and when corresponding to one of a case i) when scheduling is performed through a different CORESET group (pool), ii) a case when a different DMRS CDM group/port is configured, iii) a case when a different MCS/HARQ process number/RV/NDI is configured or iv) a case when an indication is performed through a specific field in DCI, the first data and second data may be recognized as different data/TB.

For example, an operation that UE in Step 2110 and Step 2120 (100/200 of FIG. 22) receives DCI (e.g., first DCI and/or second DCI) and/or data (e.g., first data and/or second data) from a network side (100/200 of FIG. 22) may be implemented by a device in FIG. 22 which will be described below. For example, in reference to FIG. 2, one or more processors 102 may control one or more transceivers 106 and/or one or more memories 104, etc. to receive DCI (e.g., first DCI and/or second DCI) and/or data (e.g., first data and/or second data) and one or more transceivers 106 may receive DCI (e.g., first DCI and/or second DCI) and/or data (e.g., first data and/or second data) from a network side.

UE may decode received data (e.g., first data and/or second data) through/with TRP 1 (and/or TRP 2) from a network side S2130. For example, UE may perform decoding for data and/or channel estimation based on the above-described embodiment 1, 2, and/or 3. For example, decoding for data and/or channel estimation may be performed by applying an aggregation level/TCI state mapping, etc. according to definition (e.g., defined based on a CORESET/a SS set) of a candidate of a control channel (e.g., a PDCCH).

For example, an operation that UE in step S2130 (100/200 of FIG. 22) decodes first data and/or second data may be implemented by a device in FIG. 22 which will be described below. For example, in reference to FIG. 22, one or more processors 102 may control one or more memories 104, etc. to perform an operation of decoding first data and/or second data.

UE may transmit HARQ-ACK information on first data and/or second data (e.g., ACK information, NACK information, etc.) to a network side through/with TRP 1 and/or TRP 2 S2140 and S2145. In this case, HARQ-ACK information on each of first data or second data may be transmitted to each TRP. In addition, HARQ-ACK information on first data and second data may be combined into one. In addition, UE may be configured to transmit only HARQ-ACK information to a representative TRP (e.g., TRP 1) and HARQ-ACK information transmission to other TRP (e.g., TRP 2) may be omitted.

For example, as described in detailed examples of embodiment 3, a beam/spatial relation RS which will be applied when transmitting the HARQ-ACK information (e.g., ACK information, NACK information, etc.) may be determined by comparing an interval (an offset value) between the DCI (e.g., first DCI and/or second DCI) and HARQ-ACK information (e.g., ACK information, NACK information, etc.) and a specific value. For example, when the interval (offset value) is smaller than a specific value, a default beam/a spatial relation RS may be applied and when it is greater than a specific value, a beam/a spatial relation RS may be determined based on a TCI state, etc. indicated/configured through the DCI (e.g., first DCI and/or second DCI). For example, when the control channel (e.g., a PDCCH) is repetitively transmitted, a reference PDCCH/DCI may be determined by an indication/configuration of a network side or a predefined rule and the above-described operation may be performed based on the reference PDCCH/DCI. For example, it is described based on HARQ-ACK information (e.g., ACK information, NACK information, etc.) in the above-described step, but a configuration for the beam/spatial relation RS may be also applied to an uplink channel (e.g., a PUCCH/a PUSCH).

For example, an operation that UE in Step S2140/S2145 (100/200 of FIG. 22) transmits HARQ-ACK information on first data and/or second data from a network side (100/200 of FIG. 22) may be implemented by a device in FIG. 22 which will be described below. For example, in reference to FIG. 22, one or more processors 102 may control one or more transceivers 106 and/or one or more memories 104, etc. to transmit HARQ-ACK information on first data and/or second data and one or more transceivers 106 may transmit HARQ-ACK information on first data and/or second data to a network side.

The above-described network side/UE signaling and operation may be implemented by a device which will be described below (e.g., a device in FIG. 22). For example, a network side (e.g., TRP 1/TRP 2) may correspond to a first wireless device and UE may correspond to a second wireless device and in some cases, the opposite may be considered.

Figure 22:
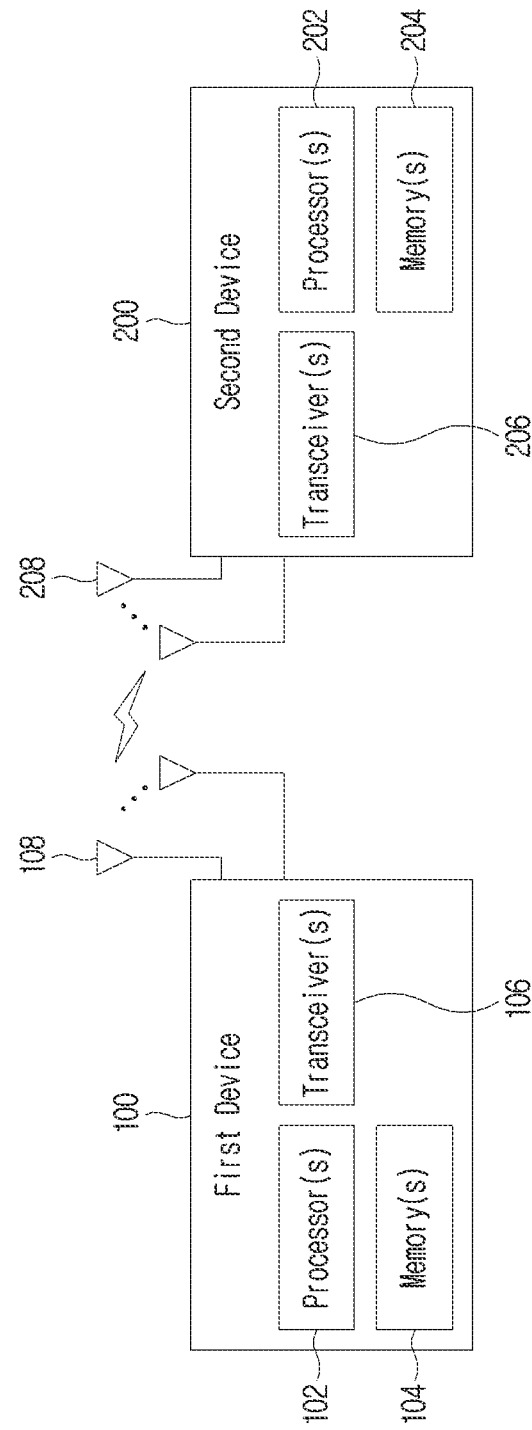
FIG. 22 illustrates a block diagram of a wireless communication system according to an embodiment of the present disclosure.

For example, the above-described network side/UE signaling and operation may be processed by one or more processors (e.g., 102, 202) in FIG. 22 and the above-described network side/UE signaling and operation may be stored in a memory (e.g., one or more memories in FIG. 22 (e.g., 104, 204)) in a form of a command/a program (e.g., an instruction, an executable code) for operating at least one processor in FIG. 22 (e.g., 102, 202).

General Device to which the Present Disclosure May be Applied

FIG. 22 is a diagram which illustrates a block diagram of a wireless communication system according to an embodiment of the present disclosure.

In reference to FIG. 22, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method performed by a terminal in a wireless communication system, the method comprising:
    monitoring, for multiple search space sets, in monitoring occasions, physical downlink control channel (PDCCH) candidates for detection of a downlink control information (DCI) format with same information, wherein at least one CORESET pool index is provided for multiple control resource sets (CORESETs) associated with the multiple search space sets, wherein the monitoring includes receiving each PDCCH candidate and decoding according to the monitored DCI format;
    based on PDCCH reception including multiple PDCCHs from the multiple search space sets, determining a time offset between a reception of DCI and a corresponding physical downlink shared channel (PDSCH) using a PDCCH candidate that ends later in time; and
    based on the time offset between the reception of DCI and the corresponding PDSCH being less than a predetermined threshold, receiving the PDSCH assuming that at least one demodulation-reference signal (DM-RS) port of the PDSCH associated with a single CORESET pool index is quasi co-located with at least one RS with respect to at least one quasi co-location (QCL) parameter used for PDCCH QCL indication of a CORESET associated with the monitored search space with a lowest CORESET identifier in a latest slot in which at least one CORESET associated with the single CORESET pool index is monitored.

2. The method of claim 1, wherein:
    based on the time offset between the reception of DCI and the corresponding PDSCH being equal to or larger than the predetermined threshold and a CORESET associated to the DCI scheduling the PDSCH being indicated with multiple transmission configuration indicator (TCI) states, a TCI state for the PDSCH is identical to a first TCI state of the multiple TCI states.

3. The method of claim 1, wherein:
    based on the time offset between the reception of DCI and the corresponding PDSCH being equal to or larger than the predetermined threshold and the DCI format not including a TCI field, a QCL assumption for the PDSCH is based on a CORESET having a lowest CORESET identifier among the CORESETs associated with the PDCCH candidates.

4. An apparatus in a wireless communication system, the apparatus comprising:

at least one processor; and at least one computer memory operably connectable to the at least one processor and storing instructions that, when executed, cause the at least one processor to perform operations comprising:

monitoring, for multiple search space sets, in monitoring occasions, physical downlink control channel (PDCCH) candidates for detection of a downlink control information (DCI) format with same information, wherein at least one CORESET pool index is provided for multiple control resource sets (CORESETs) associated with the multiple search space sets, wherein the monitoring includes receiving each PDCCH candidate and decoding according to the monitored DCI format;

based on PDCCH reception including multiple PDCCHs from the multiple search space sets, determining a time offset between a reception of DCI and a corresponding physical downlink shared channel (PDSCH) using a PDCCH candidate that ends later in time; and based on the time offset between the reception of DCI and the corresponding PDSCH being less than a predetermined threshold, receiving the PDSCH assuming that at least one demodulation-reference signal (DM-RS) port of the PDSCH associated with a single CORESET pool index is quasi co-located with at least one RS with respect to at least one quasi co-location (QCL) parameter used for PDCCH QCL indication of a CORESET associated with the monitored search space with a lowest CORESET identifier in a latest slot in which at least one CORESET associated with the single CORESET pool index is monitored.

5. The apparatus of claim 4, further comprising:
at least one transceiver through which the PDCCH and the PDSCH are received.

6. The apparatus of claim 4, wherein:
based on the time offset between the reception of DCI and the corresponding PDSCH being equal to or larger than the predetermined threshold and a CORESET associated to the DCI scheduling the PDSCH being indicated with multiple transmission configuration indicator (TCI) states, a TCI state for the PDSCH is identical to a first TCI state of the multiple TCI states.

7. The apparatus of claim 4, wherein:
based on the time offset between the reception of DCI and the corresponding PDSCH being equal to or larger than the predetermined threshold and the DCI format not including a TCI field, a QCL assumption for the PDSCH is based on a CORESET having a lowest CORESET identifier among the CORESETs associated with the PDCCH candidates.

8. A non-transitory medium which is readable by at least one processor and storing at least one instruction cause the at least one processor to perform:

monitoring, for multiple search space sets, in monitoring occasions, physical downlink control channel (PDCCH) candidates for detection of a downlink control information (DCI) format with same information, wherein at least one CORESET pool index is provided for multiple control resource sets (CORESETs) associated with the multiple search space sets, wherein the monitoring includes receiving each PDCCH candidate and decoding according to the monitored DCI format;

based on PDCCH reception including multiple PDCCHs from the multiple search space sets, determining a time offset between a reception of DCI and a corresponding physical downlink shared channel (PDSCH) using a PDCCH candidate that ends later in time; and based on the time offset between the reception of DCI and the corresponding PDSCH being less than a predetermined threshold, receiving the PDSCH assuming that at least one demodulation-reference signal (DM-RS) port of the PDSCH associated with a single CORESET pool index is quasi co-located with at least one RS with respect to at least one quasi co-location (QCL) parameter used for PDCCH QCL indication of a CORESET associated with the monitored search space with a lowest CORESET identifier in a latest slot in which at least one CORESET associated with the single CORESET pool index is monitored.

* * * * *